(12) United States Patent
Rudolph et al.

(10) Patent No.: US 12,454,988 B2
(45) Date of Patent: Oct. 28, 2025

(54) CARBON/CARBON COMPOSITES AND METHODS OF MAKING CARBON/CARBON COMPOSITES HAVING INCREASED WEAR LIFE

(71) Applicant: Goodrich Corporation, Charlotte, NC (US)

(72) Inventors: James W. Rudolph, Colorado Springs, CO (US); Atta Khan, Riverside, CA (US)

(73) Assignee: GOODRICH CORPORATION, Charlotte, NC (US)

(*) Notice: Subject to any disclaimer, the term of this patent is extended or adjusted under 35 U.S.C. 154(b) by 718 days.

(21) Appl. No.: 17/845,801

(22) Filed: Jun. 21, 2022

(65) Prior Publication Data

US 2023/0407935 A1  Dec. 21, 2023

(51) Int. Cl.
*F16D 65/12* (2006.01)
*C04B 35/52* (2006.01)
(Continued)

(52) U.S. Cl.
CPC .......... *F16D 65/126* (2013.01); *C04B 35/52* (2013.01); *C04B 35/5603* (2013.01);
(Continued)

(58) Field of Classification Search
CPC .......... F16D 65/126; F16D 2200/0047; F16D 2200/0052; F16D 2200/0069;
(Continued)

(56) References Cited

U.S. PATENT DOCUMENTS 5,527,747 A   6/1996   Lackey, Jr. et al.
5,759,622 A * 6/1998   Stover .................. C04B 41/85
                                            427/299
(Continued)

FOREIGN PATENT DOCUMENTS

CN   104311143 A  *  1/2015
CN   113277865 A  *  8/2021
EP   3015442         5/2016

OTHER PUBLICATIONS

Feng T et al, "Optimizing PyC matrix interface to improve mechanical properties of carbon/ carbon composites by rod-like SiOC ceramic", Diamond and Related Materials, Elsevier Science Publishers, Amsterdam, NL, vol. 102, dated Dec. 27, 2019, XP086002134, DOI: 10.1016/J.DIAMOND.2019.107673, retrieved on Dec. 27, 2019.

(Continued)

*Primary Examiner* — Robert A. Siconolfi
*Assistant Examiner* — Mahbubur Rashid
(74) *Attorney, Agent, or Firm* — SNELL & WILMER L.L.P.

(57) ABSTRACT

A method of manufacturing a carbon structure can comprise: infiltrating the carbon structure with a silicon oxycarbide (SiOC) precursor sol; and densifying the carbon structure by chemical vapor infiltration (CVI) to form a carbon and ceramic matrix composite material, the carbon and ceramic matrix composite material comprising between 0% and 15% by weight of a plurality of ceramic particles from the ceramic compound, densifying the carbon structure including adjusting a temperature gradient across the carbon structure.

14 Claims, 15 Drawing Sheets

(51) Int. Cl.
  *C04B 35/56* (2006.01)
  *C04B 41/45* (2006.01)
  *C04B 41/85* (2006.01)
  *B64C 25/44* (2006.01)

(52) U.S. Cl.
  CPC .......... *C04B 41/4529* (2013.01); *C04B 41/85* (2013.01); *B64C 25/44* (2013.01); *C04B 2235/3817* (2013.01); *C04B 2235/422* (2013.01); *F16D 2200/0047* (2013.01); *F16D 2200/0052* (2013.01); *F16D 2200/0069* (2013.01); *F16D 2200/0082* (2013.01)

(58) Field of Classification Search
  CPC ............. F16D 2200/0082; C04B 35/52; C04B 35/5603; C04B 41/4529; C04B 4/85; C04B 2235/3817; C04B 2235/422; B64C 25/44
  See application file for complete search history.

(56) References Cited

U.S. PATENT DOCUMENTS

| | | | |
|---|---|---|---|
| 5,962,135 | A | 10/1999 | Walker et al. |
| 6,221,475 | B1 | 4/2001 | Domergue et al. |
| 7,374,709 | B2 | 5/2008 | Bauer |
| 7,419,700 | B2 | 9/2008 | Giither et al. |
| 8,871,044 | B2 | 10/2014 | Baud et al. |
| 9,822,834 | B2 * | 11/2017 | Perea ...................... C23C 16/26 |
| 9,970,497 | B2 * | 5/2018 | Le Costaouec ..... C04B 41/4529 |
| 10,443,124 | B1 | 10/2019 | Purdy et al. |
| 10,450,236 | B2 * | 10/2019 | Kirkpatrick ........... C23C 16/045 |
| 10,563,717 | B2 * | 2/2020 | Le Costaouec ......... C23C 16/56 |
| 11,351,652 | B2 * | 6/2022 | Dukes .................... C04B 35/571 |
| 2004/0058154 | A1 * | 3/2004 | Lau .................... C04B 35/62894 428/408 |
| 2010/0055466 | A1 * | 3/2010 | Mazany ................ F16D 69/023 428/408 |
| 2014/0131151 | A1 * | 5/2014 | Gore ...................... F16D 65/12 188/218 XL |
| 2017/0002458 | A1 * | 1/2017 | Le Costaouec ....... F16D 69/028 |
| 2017/0175833 | A1 * | 6/2017 | Le Costaouec ....... D01F 11/123 |
| 2017/0368668 | A1 * | 12/2017 | Dukes .................... C08G 77/12 |

OTHER PUBLICATIONS

Sun Yuegi et al, "Preparation and properties of SiOC ceramic modified carbon fiber needled felt preform composites", Ceramics International, Elsevier, Amsterdam, NL, vol. 46, No. 2, dated Sep. 17, 2019, pp. 1743-1749, XP085919596, DOI: 10.1016/J.CERAMINT. 2019.09.148 Retrieved on Sep. 17, 2019.

Liu Chen et al, "Carbon-bonded carbon fiber composites reinforced with SiOC-based polymer derived ceramics: Microstructure and properties", Materials Letters, Elsevier, Amsterdam, NL, vol. 318, dated Apr. 6, 2022, XP087030314, DOI: 10.1016/J.MATLET.2022. 132233, Retrieved on Apr. 6, 2022.

European Patent Office, European Partial Search Report dated Nov. 27, 2023 in Application No. 23179890.1.

European Patent Office, European Search Report dated Feb. 19, 2024 in Application No. 23179890.1.

* cited by examiner

CARBON/CARBON COMPOSITES AND METHODS OF MAKING CARBON/CARBON COMPOSITES HAVING INCREASED WEAR LIFE

FIELD

The present disclosure relates to carbon/carbon composites, and more specifically, to carbon/carbon composites having increased wear life.

BACKGROUND

Aircraft brake systems typically employ a series of brake disks that, when forced into contact with each other, help to stop the aircraft. The brake disks may comprise a carbon fiber-reinforced/carbon matrix (C/C) composite material. For example, in a brake system, the rotor friction disks, stator friction disks, pressure plates, and/or end plates may be comprised of C/C composite materials. Rotor friction disks and stator friction disks comprised of C/C composite materials may exhibit varying wear characteristics, friction coefficients, and vibration profiles resulting in part from the materials used to construct the C/C composite materials and the heat treatments to which the C/C composite materials are exposed.

Depending on CVI/CVD methodology and conditions, the carbon structure may not densify at a uniform rate across the thickness of a carbon structure. Thus, creation of uniformly densified carbon structures may be impaired.

SUMMARY

A method of manufacturing a carbon structure is disclosed herein. In various embodiments, the method comprises: infiltrating the carbon structure with a silicon oxycarbide (SiOC) precursor sol; and densifying the carbon structure by chemical vapor infiltration (CVI) to form a carbon and ceramic matrix composite material, the carbon and ceramic matrix composite material comprising between 0% and 15% by weight of a plurality of ceramic particles, densifying the carbon structure including adjusting a temperature gradient across the carbon structure.

In various embodiments, the method further comprises performing a SiOC forming heating treatment on the carbon structure to form SiOC particles.

In various embodiments, forming the SiOC precursor sol comprises combining methyltrimethoxysilane and a carrier fluid. The carrier fluid can be water. The method can further comprise forming the SiOC forming heating treatment on the carbon structure. The method can further comprise heating the carbon structure at a temperature of between 900° C. and 1200° C. Performing the SiOC forming heating treatment on the carbon structure can further comprise heating the fibrous preform in a presence of nitrogen gas. In various embodiments, the method can further comprise partially densifying the carbon structure prior to infiltrating the fibrous preform with the SiOC precursor sol.

In various embodiments, the method can further comprise establishing a first thermal gradient in a process furnace, a first temperature of a first surface of the carbon structure being higher than a second temperature of a second surface of the carbon structure. The method can further comprise establishing a second thermal gradient in the process furnace, the first temperature of the first surface of the carbon structure being lower than the second temperature of the second surface of the carbon structure in response to establishing the second thermal gradient.

In various embodiments, densifying the carbon structure further comprises: establishing a thermal gradient in a process furnace containing the carbon structure having a first surface and a second surface, a first temperature of the first surface of the carbon structure being higher than a second temperature of the second surface of the carbon structure; and flowing gas through the second surface of the carbon structure to form a solid residue within the carbon structure.

In various embodiments, each ceramic particle of the plurality of ceramic particles comprises a size of less than 500 nanometers.

In various embodiments, the method further comprises heat treating the carbon structure to a temperature ranging from 1000° C. to 1600° C.

A method of manufacturing a carbon-based brake disc is disclosed herein. In various embodiments, the method can comprise: partially densifying a carbon structure, the partially densifying including establishing a first thermal gradient in a process furnace containing the carbon structure having a first surface and a second surface, a first temperature of the first surface of the carbon structure being higher than a second temperature of the second surface of the carbon structure; infiltrating the carbon structure with a ceramic compound; subsequently densifying the carbon structure by chemical vapor infiltration (CVI), the densifying including establishing a second thermal gradient in the process furnace containing the carbon structure, a third temperature of the first surface of the carbon structure being lower than a fourth temperature of the second surface of the carbon structure; and treating the carbon structure with heat at a fifth temperature ranging from 1000° C. to 1600° C. to form a plurality of ceramic particles.

In various embodiments, the ceramic compound is a first silicon oxycarbide (SiOC) precursor sol.

In various embodiments, the ceramic compound comprises at least one of zirconium, titanium, yttrium, boron, boron carbide, and graphene.

A disk brake system is disclosed herein. In various embodiments, the disk brake system can comprise: a plurality of friction disks; and wherein each friction disk in the plurality of friction disks is comprised of a carbon structure comprising a plurality of silicon oxycarbide (SiOC) particles dispersed in the carbon structure, the plurality of SiOC particles comprising between 0.5% and 15% by weight of the carbon structure.

In various embodiments, a density of the carbon structure is substantially uniform. In various embodiments, a local density at any given axial position between a first surface and a second surface is within 1% of an average density of the carbon structure. In various embodiments, a local density at any given axial position between a first surface and a second surface is within 0.5% of an average density of the carbon structure.

In various embodiments, the plurality of SiOC particles comprises between 0.5% and 5% by weight of the carbon structure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
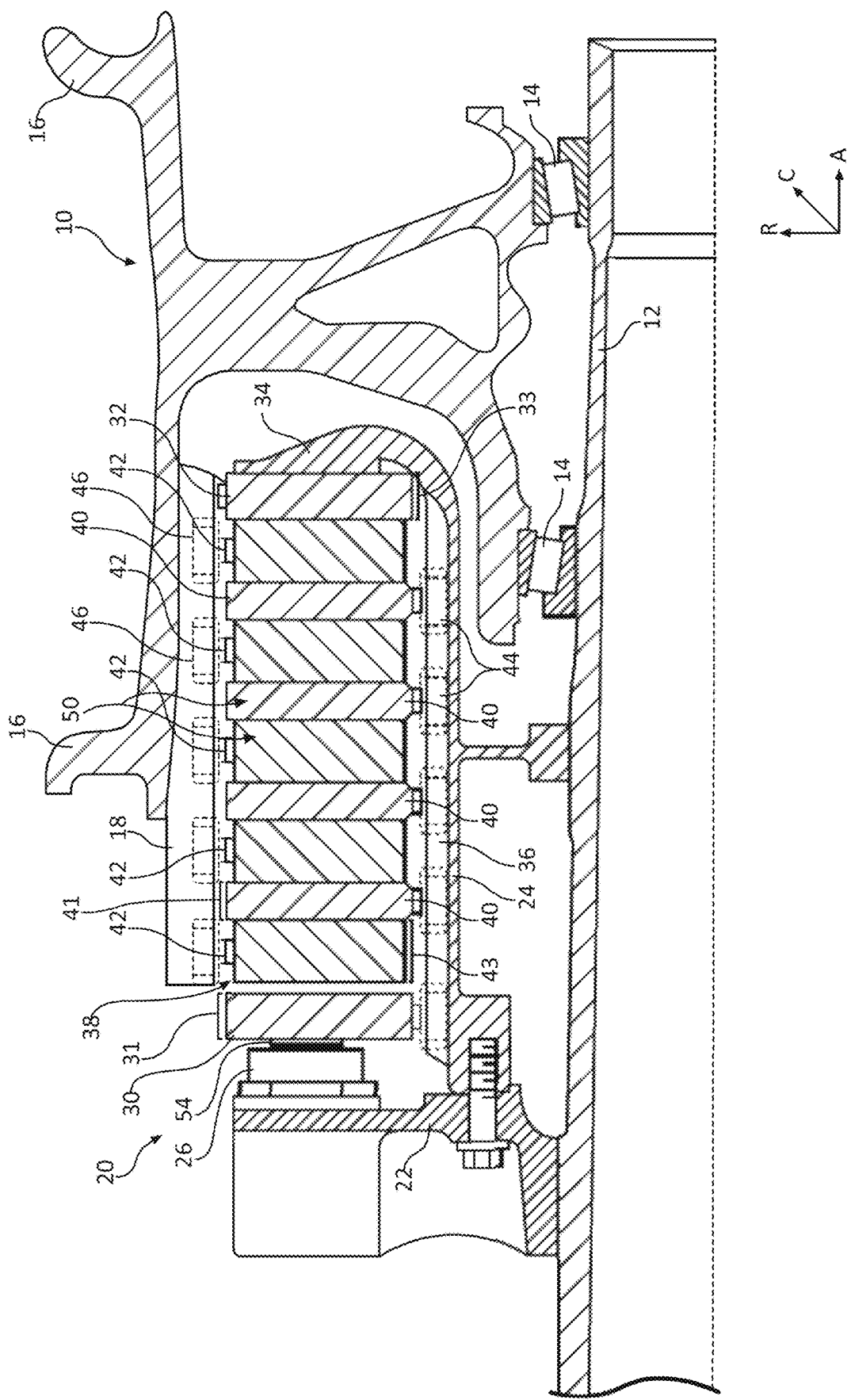
FIG. 1 illustrates a disk brake system, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration, and not of limitation. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Aircraft landing gear walk can occur when oscillations in the braking torque excite the first fundamental fore-aft mode of the landing gear. Low speed vibration is gear walk that kicks off at low speeds and high temperatures. This generally requires that the friction coefficient rises with decreasing velocity (i.e., negative mu-v slope).

For carbon/carbon brake materials, a catalyst is generally needed in order to see negative \mu-v slope. This catalyst can be a free phosphorus on the wear surfaces due to contamination by an oxidation protection system (OPS). In response to too much of the OPS on a wear surface, a low speed included vibration can occur. In response to OPS on the wear surfaces, torque can rise at the end of the stop (in pressure control), which is a precursor to low speed vibration (i.e., the negative \mu-v slope which presents risk that low speed vibration could eventually emerge). Without an OPS system at all, it appears that a torque rise or negative \mu-v slope does not occur.

New evidence has shown that not only does phosphorous act as a catalyst in accordance with the above, but ceramic particles may act as a catalyst as well. In this regard, a carbon brake disk that limits carbon particles but maintains wear benefits of typical carbon brake disks may be desirable.

The addition of ceramic materials to carbon/carbon brake materials can improve the wear life, but a significant challenge exists whereby the improved wear life comes at the expense of increased friction/torque sensitivity at low energies, creating a negative slope for coefficient of friction as a function of velocity for a frictional response and excessive vibration. In this regard, adoption of processes for treating a carbon fiber reinforced carbon structure with ceramic material additives has been limited.

As described in detail herein, the densification of a carbon structure may be accomplished using a thermal gradient process, a pressure gradient process, or a combination thereof. FIGS. 5-13 illustrate various thermal gradient/pressure gradient densification processes that are suitable for use with various embodiments. Progressive densification processes and, in particular, progressive thermal gradient/pressure gradient densification processes may be useful in efficient densification of a carbon structure. In particular, use of progressive densification processes as disclosed herein, in combination with infiltrating low amounts of ceramic content into a preform prior to densification can obtain similar wear characteristics to carbon structures with higher levels of ceramic content without corresponding negative vibrational effects.

Disclosed herein is a process for manufacturing a carbon and ceramic matrix (e.g., carbon fiber-reinforced/carbon/ ceramic matrix) composite material that reduces negative vibrational effects of ceramic additives utilized in the matrix. In particular, by reducing an amount of ceramic additives that are added in the process the negative vibration effects can be reduced and/or eliminated. However, the reduction in additives of ceramic results in a corresponding reduction in wear life benefit. In this regard, to compensate for the reduction in wear life benefit, a CVI/CVD temperature and pressure gradient process to facilitate uniform density can be utilized in combination with the reduction in ceramic additives to improve the wear life of the carbon and ceramic matrix composite material.

Disclosed herein is a C/C composite having Silicon Oxycarbide (SiOC) particles distributed therein and methods for making the same. Incorporating SiOC particles in C/C composites tends to improve the wear resistance of the C/C composite, with minimal in. SiOC particles have a thermal expansion closer to that of carbon/carbon. In accordance with various embodiments, the SiOC particles are formed by applying an SiOC precursor sol during one or more stages of the carbon/carbon fabrication and performing one or more heat treatments to form the SiOC particles.

In accordance with various aspects of the CVI/CVD processes described herein (e.g., thermal gradient and/or pressure gradient), densification occurs within a carbon structure across a densification front. The densification front may be considered as a band within a carbon structure that progresses through the thickness of a carbon structure and at which point densification of the carbon structure occurs at an increased rate, though densification may also occur to some extent outside the densification front. As the densification front completes its migration through the thickness of a carbon structure, there is additional densification that occurs outside the band. In thermal gradient/pressure gradient processes using a single carbon structure, the densification front may densify a portion of the carbon structure, but a second portion of the carbon structure may not be densified to a desired degree. This less dense portion requires additional densification or undesirable machining of the low density material, and thus the carbon structure has a non-uniform or less uniform density.

Progressive densification processes, as described herein, prevent such "waste" densification by, in various embodiments, using the "waste" densification portions as a "primer" for further densification. Progressive densification processes, as described herein, may comprise one or more stages of densification coupled with progressively altering or adjusting the relative position of one or more carbon structures or the separation of one carbon structure into multiple carbon structures in between densification cycles (also referred to as a densification "stages" and a collection of densification cycles comprising a densification process). In further embodiments, progressive densification processes may comprise one or more stages of densification coupled with progressively altering or adjusting the relative position of one or more carbon structure systems, wherein a carbon structure system may comprise one or more carbon structures, also referred to as a carbon structure system or carbon structure subsystem.

In various embodiments, progressive densification processes may allow a first region of a carbon structure (or carbon structure system) to densify to a first density while a second region of the carbon structure (or carbon structure system) densities to a second density. Then, the first region may be separated from the second region. The carbon structure (or carbon structure system) embodying the second region may coupled with a third carbon structure (or carbon structure system) to undergo additional densification. In various embodiments, the carbon structure (or carbon structure system) embodying the second region may be placed above the third carbon structure (or carbon structure system). The process may be repeated with additional carbon structures (or carbon structure systems).

The term "composite structure" may refer to a densified carbon structure. The composite structure may comprise a carbon structure with a solid residue or matrix dispersed throughout the carbon structure. The composite structure may comprise a carbonaceous carbon structure with a carbonaceous matrix dispersed in the carbon structure. This may be referred to as a carbon/carbon composite. The composite structure may comprise a ceramic carbon structure with a ceramic or oxide matrix dispersed in the carbon structure. The composite structure may comprise a mixed or hybrid composite structure such as a carbon carbon structure with a ceramic or oxide matrix dispersed in the carbon structure, a carbon carbon structure with a mix of carbon and ceramic or oxide matrix dispersed in the carbon structure, a ceramic carbon structure with a carbon matrix dispersed in the carbon structure, a ceramic carbon structure with a mix of carbon and ceramic or oxide matrix dispersed in the carbon structure, and the like.

The terms "substantially rough laminar microstructure" and "substantially smooth laminar microstructure" may be used to describe the microstructure of a composite structure employing a carbon matrix dispersed in a carbon structure. The microstructure may be determined by use of polarized light microscopy. A carbon/carbon composite with a rough laminar structure may be characterized as having high optical activity and numerous irregular extinction crosses. A carbon/carbon composite with a smooth laminar structure may be characterized as having low optical activity and smooth extinction crosses. These microstructures may be quantified in terms of their extinction angles wherein a smooth laminar structure has an extinction angle in the range from 10 to 16° while a rough laminar structure has an extinction angle greater than about 16°.

The term "thermal contact" may refer to two bodies, for example, a heating source and the surface of a carbon structure or a cooling source and the surface of a carbon structure, that may or may not be in physical contact with each other or adjacent to each other but still exchange heat with each other, such as by conduction, convection, and radiation. One body in thermal contact with another body may heat or cool the other body. In various embodiments, heat may be transferred by direct contact (i.e., conduction), by convection via gas flow, or by non-contact means, (i.e., radiation), which may be significant at high temperatures and with black-body types of materials.

The composite structures may be formed by infiltrating and depositing a matrix material in a carbon structure. The infiltrating and depositing process may be referred to as a densification process. The composite structures may be useful as carbon/carbon aircraft disk brakes, ceramic combustion and turbine components such as turbine engine hot section components, ceramic friction materials, ceramic heat sinks, and the like. The carbon/carbon disk brakes may be in the form of circular disks or annular disks.

The carbon structure may comprise at least one of carbon, silicon carbide, silicon nitride, boron carbide, aluminum nitride, titanium nitride, boron nitride, zirconia, $SiC_xN_y$, (wherein x is a number in the range from about zero to about 1, and y is a number in the range from about zero to about 4/3), silica, alumina, titania ($TiO_2$), and a combination of at least two of the foregoing. Prior to densification, the carbon structure may be referred to as a preform. A preform for use in making a carbon/carbon composite, such as a carbon/carbon disk brake, may be referred to as a carbonized preform.

As used herein, the term "carbon structure" may be interchangeable with "carbon structure system." A carbon structure system may comprise one or carbon structures that are associated. For example, a carbon structure system may comprise two carbon structures coupled so that there is contact between each carbon structure, such as in a "stack." A carbon structure system may comprise three or four carbon structures positioned so that at least two of the component carbon structures are in contact with each other. For example, a carbon structure system may comprise four carbon structures positioned in a stack formation.

A carbon structure may comprise any carbon structure derived from a fibrous material such as carbon fibers, silicon carbide fibers, and the like. The carbon fibers may be derived from polyacrylonitrile, rayon (synthetic fiber derived from cellulose), pitch, and the like. The fibrous material may be in the form of a woven, braided or knitted fabric or a needled felt. The fibrous material may be in the form of chopped carbon fibers molded to form a preform. Prior to the densification process, the fibrous material may be formed into a preform having any desired shape or form.

The carbon structure may be in the form of a disk having any shape such as, for example, a polygon, a cylinder, a triangle, square, rectangle, pentagon, hexagon, octagon, and the like. In addition, the carbon structure may have an irregular form.

The carbon structure may comprise a first surface, a second surface and at least one other surface connecting the first surface and the second surface. In various embodiments, and as used herein, any surface may be any shape such as, for example, at least one of rounded, sphere shaped, toroid shaped, or frustoconical.

The carbon structure may be in the form of a disk having a first generally planar surface and a second generally planar surface. The second generally planar surface may be positioned opposite the first generally planar surface. The term "generally planar surface" is used herein to denote the fact that the planar surfaces are not absolutely flat surfaces inasmuch as the carbon structure is porous and the planar surfaces have relatively rough surfaces as a result of the porous construction. However, in various embodiments, at least one surface of the carbon structure is generally non-planar. For example, the carbon structure may have a first generally planar surface and a second non-planar surface or a first non-planar surface and a second non-planar surface. The first and second generally planar surfaces may be bounded by the at least one other surface which may comprise at least one peripheral surface. The peripheral surface may comprise a circumferential surface. The carbon structure may be in the form of a circular disk or an annular disk. When in the form of a circular disk, the first and second generally planar surfaces may be bounded by an outside peripheral surface. When in the form of an annular disk, the first and second generally planar surfaces may be bounded by an outside peripheral surface and an inside peripheral surface.

The carbon structure may be heat treated prior to densification. The heat treating may be conducted in a vacuum (e.g., by system 110 in FIG. 3) or an inert atmosphere at a temperature in the range from about 1400 to about 2800° C., and in one embodiment in the range from about 1600 to about 2200° C., for a period of time in the range up to about 60 hours, and in one embodiment in the range up to about 10 hours. When the carbon structure comprises carbon or is formed using carbon fibers or a carbon precursor, this heat treating step may be referred to as a carbonizing step, and the heat treated carbon structure may be referred to as a carbonized preform.

The carbonized preforms may be in the form of circular or annular disks. These preforms may be used to make carbon/carbon brake disks.

The pore size and pore volume of the carbon structure (e.g., carbonized preform) should be sufficient to permit a gas to infiltrate the pores under reaction conditions and form a solid residue or matrix therein as a result of thermal decomposition.

The gas or feed gas may comprise any gas that upon thermal pyrolysis forms a desired solid residue in the pores of the carbon structure. Stated another way, the gas or feed gas may comprise a precursor to a substance that forms desired solid residue in the pores of the carbon structure. When carbon is the desired residue, as in the formation of carbon/carbon composites, the gas may comprise one or more hydrocarbons. The hydrocarbons may comprise alkanes, for example, straight chain, branched chain and/or cyclic alkanes, having from 1 to about 8 carbon atoms, and in one embodiment from 1 to about 6 carbon atoms, and in one embodiment from 1 to about 3 carbon atoms. Methane, ethane, propane, cyclopentane, or mixtures of two or more thereof may be used. The gas may comprise one or more alkenes of 2 to about 8 carbon atoms, and in one embodiment from 2 to about 6 carbon atoms. Mixtures of one or more alkanes of 1 to about 8 carbon atoms with one or more alkenes of 2 to about 8 carbon atoms may be used.

The gas may comprise one or more precursors of silicon carbide. An example of such a precursor may comprise methyltrichlorosilane, hydrogen and nitrogen. Another precursor may comprise dimethyldichlorosilane, silicon tetrahydride and a carbon source such as methane.

The gas may comprise one or more precursors of boron carbide ($B_4C$) or $Si_3N_4$. An example of a precursor of boron carbide may comprise a mixture of hydrogen, methane and boron trichloride.

These gases may be referred to as reactant gases. The gas may further comprise one or more diluent and/or inert gases, for example, hydrogen, nitrogen, helium, argon, or a mixture of two or more thereof. The volume to volume ratio of diluent and/or inert gas to reactant gas may be in the range from about 0:1 to about 50:1, and in one embodiment in the range from about 0.1:1 to about 50:1, and in one embodiment in the range from about 0.1:1 to about 30:1, and in one embodiment in the range from about 0.1:1 to about 15:1, and in one embodiment in the range from about 0.1:1 to about 10:1, and in one embodiment in the range from about 0.2:1 to about 10:1, and in one embodiment in the range from about 0.5:1 to about 5:1.

Pressure gradients may also be used with thermal gradients in various embodiments. A pressure gradient may be created when pressure on one surface of a carbon structure is different that the pressure at another surface of the carbon structure.

With reference to FIG. 1, a disk brake system 20 is illustrated. In various embodiments, the disk brake system 20 may be used to reduce the speed of a wheel of an aircraft. An A-R-C axis has been included in the drawings to illustrate the axial (A), radial (R) and circumferential (C) directions. The system may include a wheel 10 supported for rotation around an axle 12 by bearings 14. The wheel 10 includes rims 16 for supporting a tire, and a series of axially extending rotor splines 18 (one shown). Rotation of the wheel 10 is modulated by the disk brake system 20. The disk brake system 20 includes a torque flange 22, a torque tube 24, a plurality of pistons 26 (one shown), a pressure plate 30, and an end plate 32. In various embodiments, the pressure plate 30 and the end plate 32 are annular disks. The torque tube 24 is an elongated annular structure that includes a reaction plate 34 and a series of axially extending stator splines 36 (one shown). The reaction plate 34 and stator splines 36 may be integral with the torque tube 24 as shown in FIG. 1 or attached as separate components.

In accordance with various embodiments, the disk brake system 20 also includes a plurality of friction disks 38. The plurality of friction disks 38 includes at least one non-rotatable friction disk, also known as a stator friction disk 40, and at least one rotatable friction disk, also known as a rotor friction disk 42. Each of the plurality of friction disks 38 includes an attachment structure. As shown in FIG. 1, each of four stator friction disks 40 include a plurality of stator lugs 44 at circumferentially spaced positions around the stator friction disk 40 as an attachment structure. Similarly, each of five rotor friction disks 42 include a plurality of rotor lugs 46 at circumferentially spaced positions around the rotor friction disk 42 as an attachment structure. In various embodiments, and as shown in FIG. 1, the pressure plate 30, end plate 32, and friction disks 38 are all annular disks.

The torque flange 22 is mounted to the axle 12. The torque tube 24 is bolted to the torque flange 22 such that the reaction plate 34 is near an axial center of the wheel 10. The end plate 32 is connected to a surface of the reaction plate 34 facing axially away from the axial center of the wheel 10. Thus, the end plate 32 is non-rotatable by virtue of its connection to the torque tube 24. The stator splines 36 support the pressure plate 30 so that the pressure plate 30 is also non-rotatable. The stator splines 36 also support the stator friction disks 40. The stator friction disks 40 engage the stator splines 36 with gaps formed between the stator lugs 44. Similarly, the rotor friction disks 42 engage the rotor splines 18 with gaps formed between the rotor lugs 46. Thus, the rotor friction disks 42 are rotatable by virtue of their engagement with the rotor splines 18 of the wheel 10.

As shown in FIG. 1, the rotor friction disks 42 are arranged with the end plate 32 on one end (having an end plate thickness 33), the pressure plate 30 on the other end (having a pressure plate thickness 31), and the stator friction disks 40 (each having a stator thickness 41) interleaved so that the rotor friction disks 42 (each having a rotor thickness 43) are adjacent to non-rotatable friction components. In various embodiments, the number of rotor friction disks 42 and stator friction disks 40 may vary according to the brake assembly design. The pistons 26 are connected to the torque flange 22 at circumferentially spaced positions around the torque flange 22. The pistons 26 face axially toward the wheel 10 and include pucks 54 that contact a side of the pressure plate 30 opposite the rotor friction disks 42. The pistons 26 may be powered electrically, hydraulically or pneumatically.

In various embodiments, prior to operation of the disk brake system 20, pistons 26 are not actuated and gaps exist between each of rotor friction disks 42 and each of the non-rotatable friction components, namely pressure plate 30, end plate 32, and stator friction disks 40. The gaps are formed by the axial spreading out of the rotor friction disks 42 along the rotor splines 18; and the stator friction disks 40, and the pressure plate 30 along the stator splines 36 due to the movement of the rotor friction disks 42 adjacent to the non-rotatable friction components. During operation of the disk brake system, pistons 26 are actuated, forcing the pressure plate 30 to move along stator splines 36 against the plurality of the friction disks 38, forcing them axially toward the end plate 32 and reaction plate 34. Squeezed between the pressure plate 30 and the reaction plate 34, the gaps are eliminated as friction surfaces contact other friction surfaces.

The friction disks 38 of the disk brake system 20 may be comprised of carbon structures comprising carbon composite material. Contact between friction disks 38 during operation of the disk brake system 20 as described above causes the friction disks 38 to wear over time. In various embodiments, in order to improve the wear rate of the friction disks 38, ceramic particles may be incorporated into the carbon materials during the fabrication process of the carbon composite material comprised in the friction disks 38.

Figure 2:
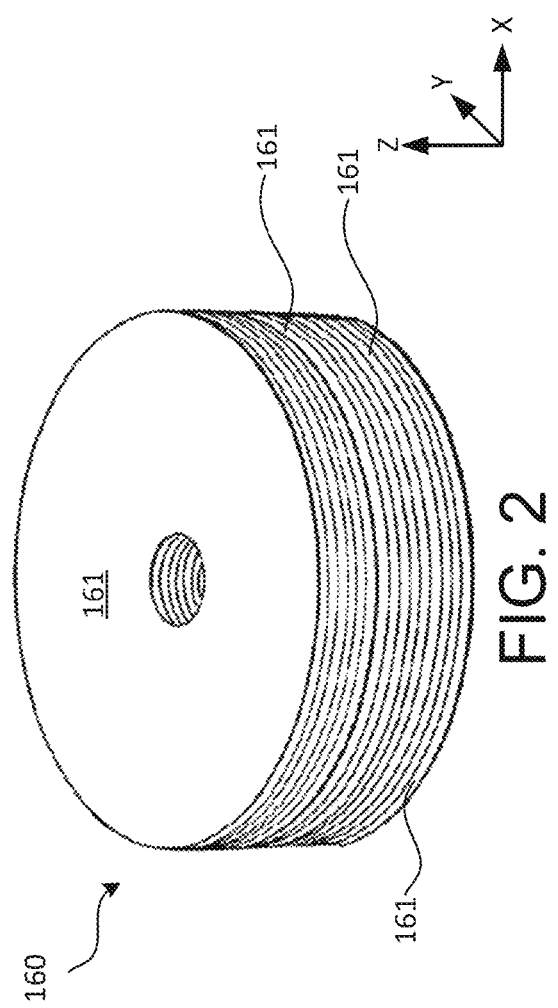
FIG. 2 illustrates a fibrous preform, in accordance with various embodiments.

Referring now to FIG. 2, a fibrous preform 100, which may be used to fabricate one or more of the friction disks of FIG. 1 is illustrated, in accordance with various embodiments. Fibrous preform 100 may comprise a porous structure comprised of a plurality of stacked textile layers 102. As used herein, a porous structure includes any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 100 may be prepared by needling the textile layers 102 of fibrous preform 100. Needling the textile layers 102 tends to push fibers from one layer 102 into the next layer 102, thereby forming z-fibers that extend perpendicularly across the layers 102. After needling, fibrous preform 100 may comprise fibers extending in three different directions (i.e., in the x and y directions and the z direction).

In various embodiments, it may be desirable to incorporate the hard ceramic particles into the carbon structure to improve the wear rate of the carbon composite material comprised in friction disks 38 from FIG. 1. As described further herein, articles comprising zirconium compounds, such as zirconium oxycarbides and zirconium carbides, for example, may be incorporated into wear products such as friction disks 38 via infiltration of ceramic particles in fibrous preform 100, to improve wear rate. Zirconium compounds are suitable for this purpose in part because of the abundance and affordability of zirconium raw materials. In various embodiments, yttrium compounds may be introduced to the carbon structure during the fabrication process. Yttrium compounds are hard, dense compounds (in various physical forms), and therefore, the addition of particles comprising yttrium compounds may provide better wear properties for the friction disks 38 than zirconium particles alone. Yttrium raw materials are typically rarer and, thus, more expensive than zirconium raw materials, especially in fine particle size powders or suspensions of zirconium raw materials.

Yttria-stabilized zirconia powders and/or suspensions have become commercially available at an affordable cost. In various embodiments, dense zirconia products may be manufactured with a doping agent, such as yttrium oxide, to stabilize the zirconia. In various embodiments, the hardness and wear rate of the carbon composite material in the friction disks 38 may be increased and improved by incorporating yttria-stabilized zirconia into the carbon structure during the fabrication process of the friction disks 38. After densification, the carbon structure comprising the carbon composite material 50 of the friction disks 38 may be left with a plurality of ceramic particles to increase hardness and improve wear rate. By using yttria-stabilized zirconia, the carbon composite material 50 of the friction disks 38 may comprise ceramic particles of one or more of zirconium oxycarbide, zirconium carbide, yttrium oxycarbide and/or yttrium carbide. In various embodiments, the carbon composite material 50 of the friction disks 38 may comprise residual yttria-stabilized zirconia. The various combinations of zirconium particles and yttrium particles tend to improve the wear rate. While not desiring to be bound by theory, it is thought that this effect is because of the added hardness and density from yttrium oxycarbide and yttrium carbide particles.

In various embodiments, in each of the friction disks 38, the plurality of ceramic particles, including zirconium oxycarbide, zirconium carbide, yttrium oxycarbide, and/or yttrium carbide, and possibly residual yttria-stabilized zirconia, in the carbon composite material 50 may comprise 0.5% to 12% of the finished carbon-carbon structure, by weight. In various embodiments, each ceramic particle in the carbon composite material 50 of the friction disks 38 may comprise a size of less than 500 nanometers.

The processes disclosed herein may include treatments for producing carbon fiber reinforced carbon composite material. Thus, as used herein the term "carbon structure" may be used to describe a carbon preform 100, a carbon fiber reinforced carbon material at various stages of densification, a carbon structure prior to densification and carbon reinforcement, and/or a finished carbon composite material.

The processes for treating carbon structures disclosed herein further include infiltration of a ceramic preparation, comprising ceramic particles having zirconium oxides and yttrium oxides, into a carbon structure to prepare the carbon structure. In various embodiments, the ceramic particles may have zirconium oxides and yttrium oxides that are in a combined state at the particle level and/or molecular level, for example, in particles comprising yttria-stabilized zirconia. In various embodiments, the ceramic particles may have zirconium oxides and yttrium oxides that are not in a combined state at the particle level and/or molecular level, and instead the zirconium oxides and yttrium oxides may be in a separated state. As used herein, ceramic preparation describes a ceramic suspension, which may be a colloidal suspension, and/or a ceramic sol gel for infiltration into a carbon structure.

Although described herein as including ceramic compounds that are zirconium compounds and/or yttrium compounds, the present disclosure is not limited in this regard. For example, ceramic compounds (or additives) as disclosed herein can include titanium, boron, boron carbide, graphene, or any combination of the aforementioned compounds.

Figure 3:
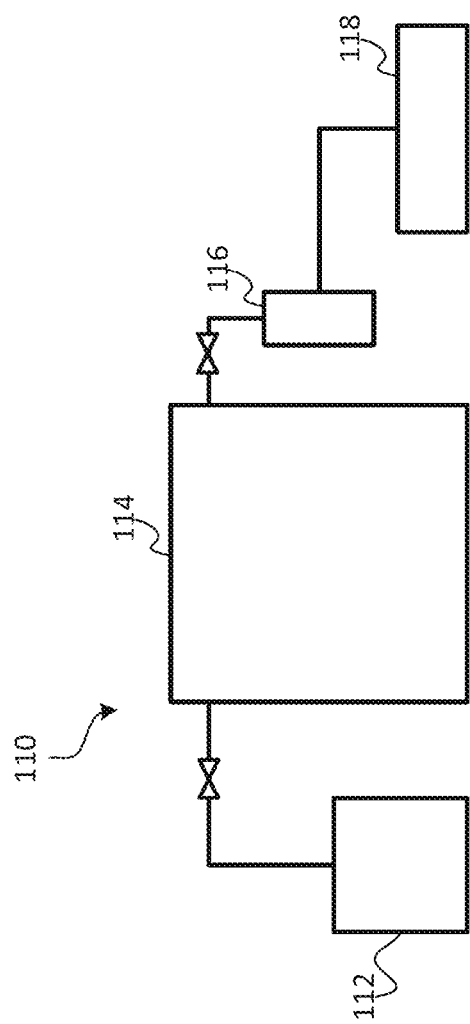
FIG. 3 illustrates an exemplary preform infiltration system, in accordance with various embodiments.

For example, as described in further detail below, the carbon structure 160 may be infiltrated with a SiOC precursor preparation. In accordance with various embodiments, the SiOC precursor preparation may be a sol formed by mixing water and an allyltrimethoxysilane (e.g., methyltrimethoxysilane ("MTMS")). With reference to FIG. 3, an exemplary preform infiltration system 110 is shown, in accordance with various embodiments. System 110 may include a fluid reservoir 112 for storing and delivering the SiOC precursor suspension into the vacuum chamber 114. Vacuum chamber 114 is equipped with a tank in which the carbon structure 160 (FIG. 2) may be located. Vacuum pump 118 and trap 116 are used to first evacuate the porosity of the carbon structure 100 and subsequently facilitate drawing the SiOC precursor suspension into the tank containing the parts to be infiltrated (e.g., the carbon structure 160). In various embodiments, following infiltration, the carbon structure 160 are removed and dried in a separate oven. In various embodiments, the SiOC precursor preparation may be applied by dipping the carbon structure 160 in the sol or by any other suitable application method After infiltrating the carbon structure 160 with the SiOC precursor preparation, the infiltrated carbon structure 160 may undergo a series of heat treatment(s) and densification cycles. In accordance with various embodiments, the incorporation of SiOC precursors throughout the fibrous preform 100 or throughout a partially densified fibrous preform may lead to the formation of SiOC particles during the subsequent heat treatments and a series of carbon densification cycles. Additives such as a wetting agent may be included in the SiOC precursor suspension to facilitate wetting of the preform or of the partially densified carbon structure 160. During subsequent heat treatments of the carbon structure 160, which, in various embodiments, may be performed in the presence of nitrogen gas, the SiOC precursors are transformed into SiOC particles. In various embodiments, the SiOC particles may comprise an average particle size of less than 500 nm, less than 250 nm, less than 100 nm and or less than 50 nm (e.g., an average particle size of between 10 nm and 500, between 10 nm and 250 nm, between 10 nm and 100, or between 10 and 50 nm). In various embodiments, the SiOC particles may comprise an average particle size of between 0.5 micrometers and 5 micrometers.

Figure 4:
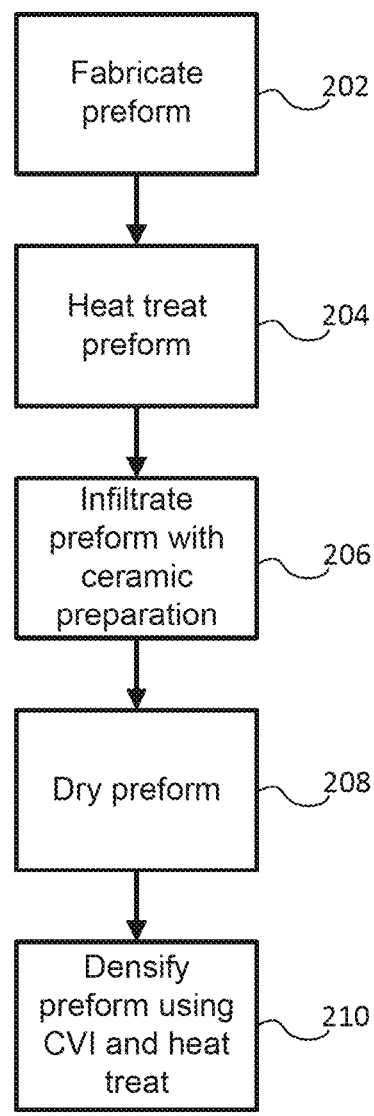
FIG. 4 illustrates a process for forming carbon components with a ceramic material, in accordance with various embodiments.

With reference to FIG. 4, a process 200 for treating a carbon fiber reinforced carbon structure is shown, in accordance with various embodiments. A fiber preform may be fabricated (Step 202). The fiber preform or carbon structure may comprise a carbon structure. A carbon structure may comprise any carbon structure derived from a fibrous material such as carbon fibers or the like. The carbon fibers may be derived from polyacrylonitrile (PAN), rayon (synthetic fiber derived from cellulose), pitch, or the like. The starting fiber may be pre-oxidized PAN or fully carbonized commercial carbon fiber. The fibrous preform is preferably prepared using needling of individual textile layers. The individual brake preform may be fabricated using a net shape preforming technology or may be cut from a needled board. Alternatively, preforms may be a 2D lay-up of woven, braided or knitted fabric. The fibrous material may be in the form of chopped carbon fibers molded to form a preform. Prior to the densification process, the fibrous material may be formed into a preform having any desired shape or form. For example, the carbon structure may be in the form of a disk having any shape such as, for example, a polygon, a cylinder, a triangle, annular, square, rectangle, pentagon, hexagon, octagon, or the like. In addition, the carbon structure may have an irregular form.

In various embodiments, the preform may be heat treated (Step 204) at temperatures between 1000° C. and 2200° C. Heat treatments described herein may vary in temperatures and durations.

In various embodiments, the preform may be infiltrated with a ceramic preparation that is at least one of a ceramic colloidal suspension or sol gel solution prepared with a selected ceramic content (Step 206). In various embodiments, the ceramic content can include an aqueous colloidal suspension of very fine oxides and boron or oxide boron compounds. The starting colloidal oxides may be nano-size suspensions. The boron compound powders may be as small as possible, less than 2 micron and preferably submicron size.

In various embodiments, the ceramic content can include yttrium compounds and zirconium compounds. In various embodiments, the yttrium compounds and zirconium compounds may be combined at the particle level, for example, in particles comprising yttria-stabilized zirconia. For example, an aqueous colloidal suspension comprising yttria-stabilized zirconium compounds, such as $Y_2O_3$—$ZrO_2$, may be introduced in the carbon composite as described in detail below. The starting ceramic powders may comprise ceramic particles of yttria-stabilized zirconia having various sizes, for example, sizes ranging from 40 nanometers to 60 nanometers ($1.57e^{-6}$ inches to $2.36e^{-6}$ inches), or from 10 nanometers to 13 nanometers ($3.9e^{-7}$ inches to $5.1e^{-7}$ inches).

In various embodiments, the incorporation of a controlled starting amount of very fine ceramic particles, comprising particle sizes described herein, throughout the carbon composite may lead to the formation of ultra-fine boride particles (e.g., zirconium diboride, titanium diboride, and/or yttrium diboride), very fine yttrium, zirconium compounds, or the like following subsequent heat treatments and further carbon densification cycles, comprising sizes below 500 nanometers ($2.0e^{-5}$ inches). The borides may be a single boride, a mixed borides or a combined boride. This may be accomplished by the preparation and introduction of a suspension containing either a single oxide like ZrO2 or TiO2 and a boron source; or mixed oxides like ZrO2 and TiO2 and a boron source; or a combined oxide like ZrO2/Y2O3 and a boron source. Additives such as a wetting agent are made to the ceramic suspension to facilitate wetting of the preform or of the partially densified carbon structure. During subsequent heat treatments of the carbon structure under an inert atmosphere at temperatures greater than 1100° C., a boride or mixed borides may be formed through borothermal reduction of the oxide or oxides, or more specifically, a carbo-thermal reduction of yttrium oxides and zirconium oxides may occur, yielding zirconium oxycarbide, zirconium carbide, yttrium oxycarbide, and/or yttrium carbide compounds. In various embodiments, residual yttrium oxides and zirconium oxides, which may be combined as yttria-stabilized zirconia, may remain after the heat treatments.

In various embodiments, the oxide compounds may be introduced using sol gel solution starting with one or several alkoxides such as zirconyl nitrate, zirconium butoxide, zirconium propoxide, titanium isopropoxide, titanium butoxide, tetrabutyl titanate, yttrium nitrate. The boron source may be one of several compounds including boric acid.

In various embodiments, it may be advantageous to provide an additional source of carbon to the colloidal ceramic suspension or sol gel solution to control the grain size of the particles comprising zirconium oxides and/or yttrium oxides, which may be combined in yttria-stabilized zirconia, for example, during the carbo-thermal reduction of the yttrium oxides and zirconium oxides. This may be accomplished by adding a carbon compound to the starting suspension in the form of one or several water soluble polymers such as a polyvinyl alcohol (PVA), polyvinylpyrrolidone (PVP), polyvinyl acetate, poly (2-oxazoline), polyacrylamide (PAM), polyethyleneimine (PEI), and/or polyacrylate (PAA). An aqueous emulsion of polyester, epoxy, or phenolic may be also used. Aqueous carbon black dispersions may be used as the additional carbon source, or to supplement a water-soluble polymer. These carbon sources exhibit various char yields and may be introduced in the form of one or more components. Prior to adding the additional carbon compound to the ceramic suspension, the pH of the ceramic suspension may be adjusted. For example, the pH of the ceramic suspension may be made more basic by adding ammonium hydroxide or other similar Arrhenius base.

In various embodiments, effectiveness of the carbon addition may be improved by pursuing the individual carbon coatings of the ceramic particles comprising yttrium oxides and/or zirconium oxides, which may be in a combined state in, for example, yttria-stabilized zirconium. Encapsulation of the ceramic particles with a thin polymeric layer of carbon during the preparation of the suspension may be accomplished by the addition of a polyelectrolyte dispersant or organic acid, such as citric acid, trans-aconitic acid, or cis-aconitic acid, into the ceramic suspension, which absorbs and coats the ceramic particles. The type and amount of polyelectrolyte may be chosen to provide a sufficient carbon char yield upon heat treatment in an inert atmosphere. In various embodiments, dispersants include ammonium polyacrylates, poly ethyleneimine, and/or polyacrylamide. In response to subsequent processing, the absorbed layer of polymer may be pyrolyzed into a carbon film.

In various embodiments, the addition of an aqueous carbon black dispersion and/or additional water soluble polymer to the colloidal ceramic suspension may take place to achieve a greater amount of carbon. The addition of an aqueous carbon black dispersion and/or additional water soluble polymer to the colloidal ceramic suspension may take place following the formation of an adsorbed polymer layer on the ceramic particles from the polyelectrolyte dispersant or organic acid, or the carbon black dispersion and/or the water soluble polymer may be the only source of carbon in the ceramic preparation.

In various embodiments, the polymer may take different forms. The polymer may be a non-ionic polymer like PVA, PAM, an aqueous emulsion of polyester, epoxy, or phenolic, or a combination of two or more of the polymers. The molecular weight and quantity of polymer may be chosen to maintain the overall viscosity of the colloidal suspension low in order to facilitate its infiltration within the carbon composite.

In various embodiments, the aqueous ceramic suspension may be prepared from dry ceramic powder, comprising yttria-stabilized zirconia, and/or already suspended yttria-stabilized zirconia particles. The zirconia particles may be partially or fully stabilized by yttria, depending on the amount of yttria incorporated into the zirconia compounds. Zirconia particles partially stabilized by yttria may comprise uniform dispersion of 3 mol % of yttria, or about 5.2% by weight, wherein the term "about" in this context only refers to plus or minus 0.2%. Zirconia that is fully stabilized by yttria may comprise 4, 6, 8, and/or 10 mol % content, or about 7, 10.3, 13.3, and 15.9% by weight, respectively, wherein the term "about" in this context only refers to plus or minus 0.2%. For example, in preparing an aqueous ceramic suspension, a dry ceramic powder comprising agglomerated ceramic granules of yttria-stabilized zirconia, and/or an yttria-stabilized zirconia suspension, may be added to distilled water. The ceramic suspension may be dispersed using a high energy mixer, such as an attrition mill of a high shear mixer, in order to break down the ceramic granules to their elementary nanosize original states. The ceramic suspension may be further de-agglomerated using ultrasounds. A wetting agent may be added to facilitate wetting of the preform and or partially densified carbon structure. The pH of the ceramic suspension may be raised to a level at or between 10 and 11 using ammonium hydroxide, which may comprise 0.3% of ammonium polyacrylate polyelectrolyte.

In various embodiments, oxide sources may include nano suspensions of zirconia, yttria stabilized zirconia, $TiO_2$, and/or $Y_2O_3$. In various embodiments, oxide sources may further include sol gel from one or several alkoxides such as zirconyl nitrate, zirconium butoxide, titanium isopropoxide, titanium butoxide, yttrium nitrate. Additionally, a Ti or Zr source may be a chelate such as aqueous titanium lactate, aqueous zirconyl chloride compound.

Ceramic colloidal suspensions comprising yttrium oxides and zirconium oxides may be prepared using various materials. In various embodiments, a dry ceramic powder comprising 10% by weight of yttria-stabilized zirconia ($Y_2O_3$—$ZrO_2$, with 16% $Y_2O_3$ by weight) may be added to distilled water comprising 0.2% ammonium polyacrylate polyelectrolyte. The ceramic powder may be made of nanosize particles, which may be available in agglomerated granules to limit the health hazard associated with the handling of nanosize powder. The ceramic granules comprised in the ceramic powder may be dispersed using a high energy mixer, such as an attrition mill of a high shear mixer, in order to de-agglomerate the ceramic granules to their elementary nanosize original states. The pH of the solution may be increased to at or between 10 and 11 by adding ammonium hydroxide. Non-ionic aqueous nano carbon black, having a pH at or between 9 and 11, may be added and mixed into the ceramic suspension. The amount of added carbon black may correspond to a ratio of carbon/yttria-stabilized zirconia of 0.29, or 2.8% of the total ceramic suspension. The ceramic suspension may further be de-agglomerated using ultrasounds.

In various embodiments, a dry ceramic powder comprising 21% by weight of yttria-stabilized zirconia ($Y_2O_3$—$ZrO_2$, with 5.2% $Y_2O_3$ by weight) may be added to distilled water comprising 2% citric acid polyelectrolyte. The pH of the solution may be increased to at or between 10 and 11 by adding ammonium hydroxide. The ceramic granules comprised in the ceramic powder may be dispersed using a high energy mixer, such as an attrition mill of a high shear mixer, in order to de-agglomerate the ceramic granules to their elementary nanosize original state. Non-ionic aqueous nano carbon black, comprising a particle size of 30 nanometers (1.2e−6 inches) and having a pH at or between 9 and 11, may be added and mixed into the ceramic suspension. The amount of added carbon black may correspond to a ratio of carbon/yttria-stabilized zirconia of 0.22. The ceramic suspension may further be de-agglomerated using ultrasounds.

In various embodiments, possible boron sources may include boron, boron carbide powder, boron oxide powder, and/or boric acid. The aqueous ceramic suspension may be infiltrated either within the porosity of the preform or within the porosity of partially densified carbon-carbon. The infiltration may be conducted by immersing the preform or partially densified carbon-carbon in the aqueous ceramic suspension. Infiltration may also be conducted following evacuation of the pores using a vacuum chamber 114 from FIG. 3. Following introduction of the slurry within the part, the part may be dried to remove water. The targeted amount of dry ceramic compound ranges from 0.5% to 12% by weight of the finished carbon composite. The ceramic content of the aqueous ceramic suspension may be selected to leave ceramic compounds in the targeted range. The range may provide wear improvement benefit without negatively impacting the mechanical properties of the carbon composite.

In various embodiments, a ceramic colloidal suspension comprising 25% by weight of yttria-stabilized zirconia ($Y_2O_3$—$ZrO_2$, with 16% $Y_2O_3$ by weight) may be added to distilled water to produce a 15% by weight yttria-stabilized zirconia loading suspension. The pH of the solution may be increased from 5 to 11 by adding ammonium hydroxide with 0.3% ammonium polyacrylate polyelectrolyte. The ceramic suspension may be dispersed using a high energy mixer, such as an attrition mill of a high shear mixer. Non-ionic aqueous nano carbon black, which may comprise 35.5% by weight of carbon black and may have a pH at or between 9 and 11, may be added and mixed into the ceramic suspension. The amount of added carbon black may correspond to a ratio of carbon/yttria-stabilized zirconia of 0.18. The ceramic suspension may further be de-agglomerated using ultrasounds.

In various embodiments, a ceramic colloidal suspension comprising 25% by weight of yttria-stabilized zirconia ($Y_2O_3$—$ZrO_2$, with 13.6% $Y_2O_3$ by weight) may be added to distilled water, polyelectrolyte, PVA, and carbon black to produce a 6% by weight yttria-stabilized zirconia loading suspension. The ceramic suspension may comprise 1.1% PVA and 1% carbon black (dry weight). The pH of the solution may be increased from 5 to 11 by adding ammonium hydroxide and 0.3% ammonium polyacrylate polyelectrolyte. The ceramic suspension may be dispersed using a high energy mixer, such as an attrition mill of a high shear mixer. The carbon black added to the ceramic suspension may be non-ionic aqueous nano carbon black, which may comprise 35.5% by weight of carbon black and may have a pH at or between 9 and 11. The amount of added carbon black may correspond to a ratio of carbon/yttria-stabilized zirconia of 0.17 following the transformation of PVA into carbon. The ceramic suspension may further be de-agglomerated using ultrasounds.

In various embodiments, the ceramic preparation, which may be an aqueous ceramic suspension, or slurry, may infiltrate the porosity of a carbon preform, the porosity of partially densified carbon structure, and/or other carbon structure. The porosity of a carbon structure refers to the pores, or spaces, between the carbon fibrous network. The infiltration may be conducted by immersing the carbon preform or partially densified carbon structure in the aqueous ceramic suspension. In various embodiments, infiltration may be conducted following evacuation of the pores of the carbon structure using a vacuum chamber 114 from FIG. 3.

In various embodiments, following introduction of the ceramic preparation within the carbon structure, the carbon structure may be dried to remove water. The ceramic content of the aqueous ceramic suspension or ceramic preparation may be selected to leave ceramic compounds of a targeted amount in the finished carbon composite. The targeted amount of dry ceramic compound, comprising yttrium oxycarbides, yttrium carbides, zirconium oxycarbides, zirconium carbides, residual yttria-stabilized zirconia, and/or any other dry ceramic compound disclosed previously herein may range from 0.01% to 12% by weight of the finished carbon composite, or between 0.01% to 6% by weight, or between 0.1% and 0.5% by weight, or between 0.1% and 0.4% by weight. That range may provide wear improvement of the carbon structure when used in applications such as brake disks, while significantly reducing vibrational effects from the ceramic compound compared to typical carbon structures with ceramic content therein. For example, if the amount of dry ceramic compounds comprise more than 0.5% by weight in a finished carbon-carbon structure, the ceramic compounds may cause increased friction/torque sensitivity at low energies, creating a negative mu-V slope frictional response and/or excessive vibration.

In various embodiments, the ceramic particles, comprising yttrium oxides and/or zirconium oxides, in the ceramic preparation may infiltrate the carbon structure at one stage of the carbon composite fabrication, for example at the preform level, as shown in Step 206. In various embodiments, the ceramic particles in the ceramic preparation may infiltrate carbon structure prior to densification only (i.e., prior to step 210) in order to ensure the CVI process produces a uniform density gradient across the carbon structure to accommodate for the decrease in wear life from providing a lower amount of ceramic content.

Following drying of the ceramic suspension incorporated within the carbon structure, the preform may be heat treated to a suitable temperature in an inert environment so as to transform the added polymer or other carbon source, such as carbon black, into amorphous carbon. This step may be conducted in a separate furnace or during the ramp up to the temperature of a CVI pyrolytic carbon densification cycle. In various embodiments, following each addition of pyrolytic carbon to the carbon structure, the carbon structure may be heat treated in inert atmosphere to fully or partially complete the thermo-reduction of the yttrium oxides to yttrium oxycarbides and/or yttrium carbides, and the zirconium oxides to zirconium oxycarbides and/or zirconium carbides by the additional source of carbon in the form of pyrolyzed polymers and/or carbon black. In various embodiments, heat treatment may be conducted only after specific CVI densification cycles, for example, following the final CVI densification step 210.

Returning to FIG. 4, after ceramic preparation infiltration, the preform may be dried (Step 208). The preform may further be densified using one or multiple CVI cycles (Step 210). Each CVI cycle may be followed by a heat treatment, as depicted in Step 210. The carbon structure may be subjected to a heat treatment between 1000° C. and 1600° C., for example.

The apparatus and process for performing step 210 of process 200 will now be discussed with reference initially to FIGS. 5-13, the apparatus for conducting the densification process may comprise densification chamber 100 which contains densification unit 120. The densification chamber 100 may be in the form of a cylindrical pressure vessel. Densification unit 120 may be circular to conform to the shape of the densification chamber 100. Support structure 140 forms part of the densification unit 120, and carbon structure 160 is mounted on support structure 140. Seal ring 180 is positioned between the support structure 140 and the carbon structure 160. Seal ring 180 may be formed separately from the support structure 140 and then mounted on the support structure 140, or it may be formed integrally with the support structure 140.

Figure 5:
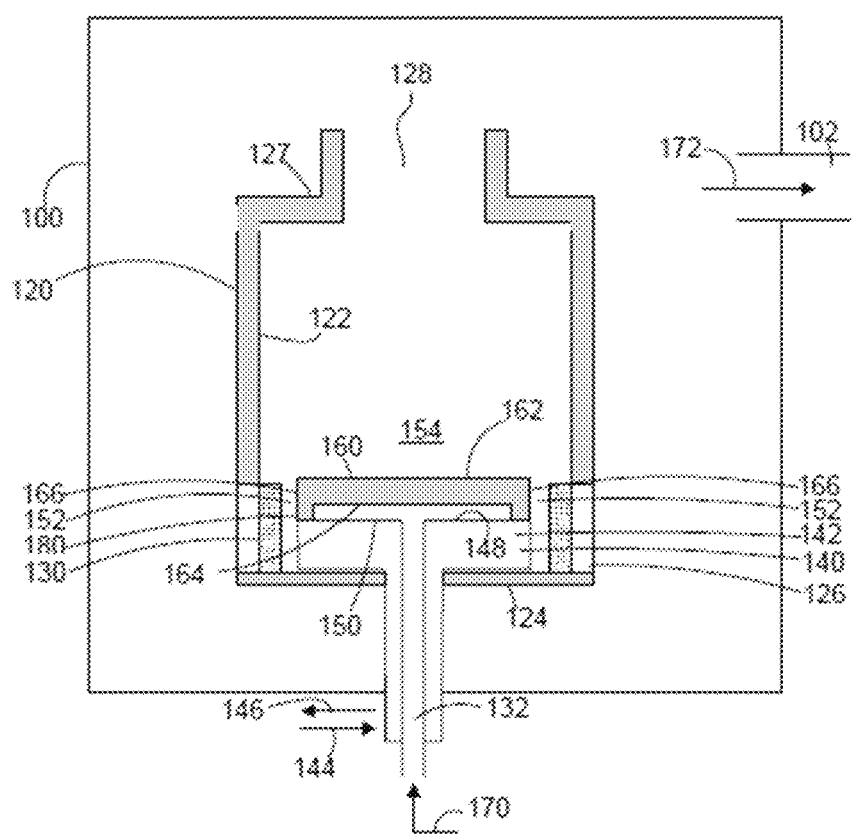
FIG. 5 is a schematic illustration of an apparatus for conducting a densification process pursuant to various embodiments.
Figure 6:
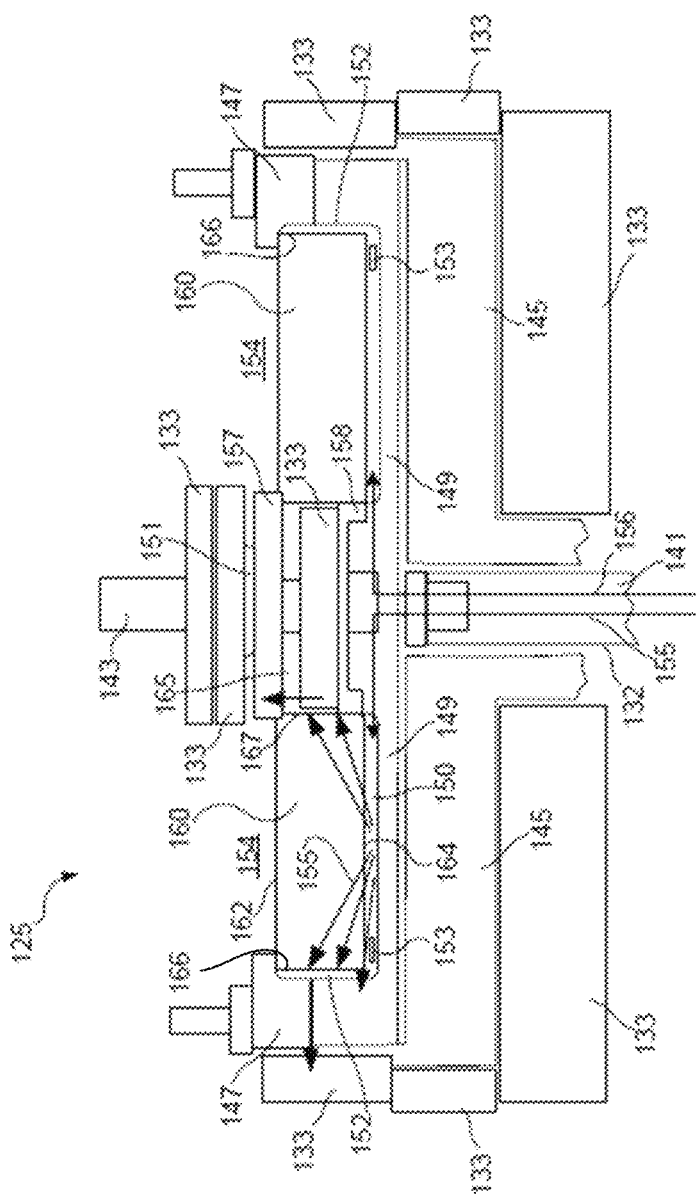
FIG. 6 is a schematic illustration of an apparatus similar to the apparatus illustrated in FIG. 5, with the exception that the apparatus illustrated in FIG. 6 is adapted for densifying a carbon structure in the form of an annular disk.
Figure 7:
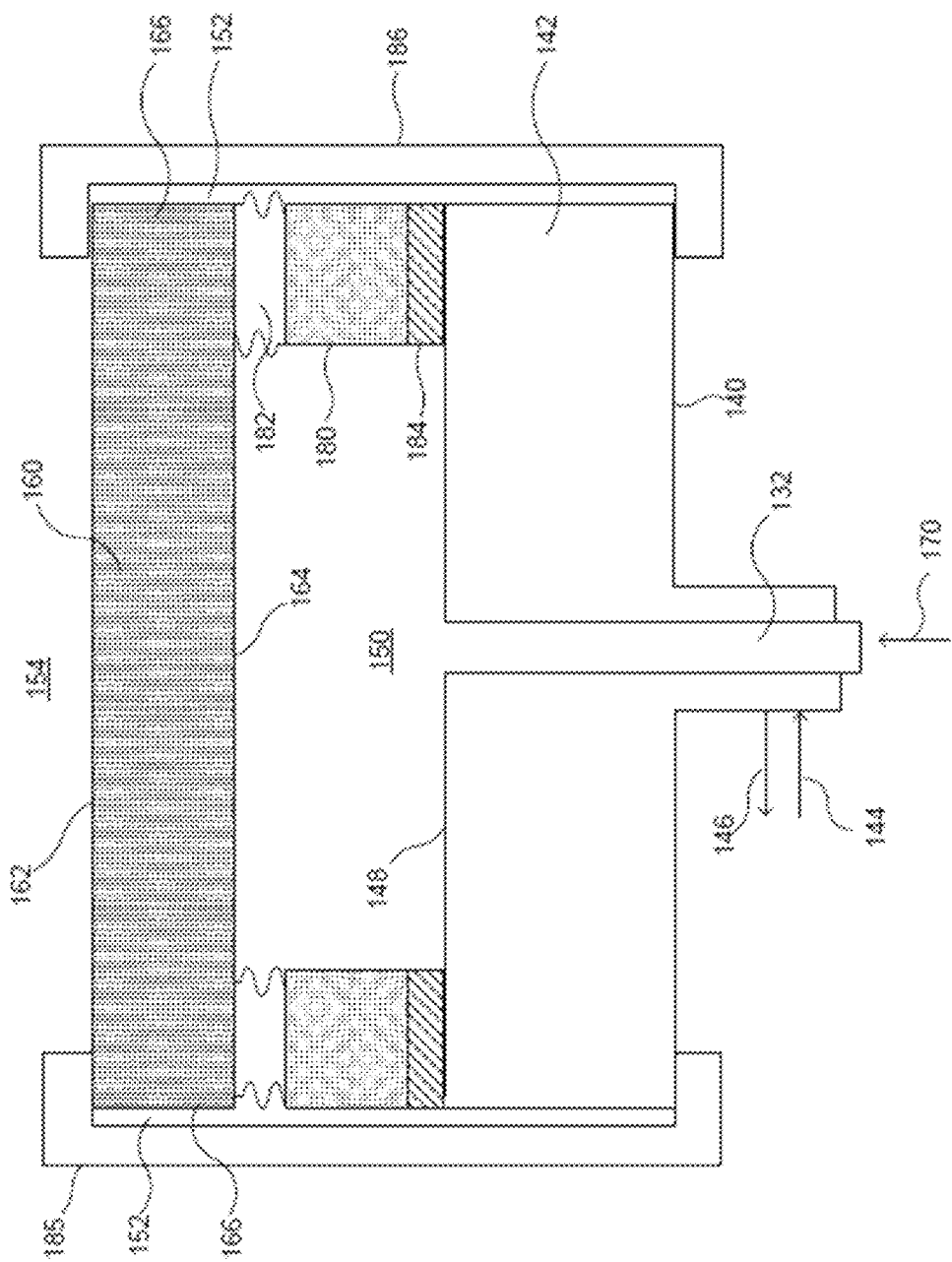
FIG. 7 is a schematic illustration of the carbon structure, support structure and seal ring illustrated in FIG. 5.

The carbon structure 160 has a first surface 162, which may be in the form of a first generally planar surface, and a second surface 164, which may be in the form of a second generally planar surface. The first and second surfaces are connected by at least one other surface. The carbon structure 160 may be in the form of a circular disk or an annular disk. The circular disks have outside diameters (OD), while the annular disks have both outside diameters (OD) and inside diameters (ID). The at least one other surface may be in the form of peripheral surface 166 (circular disk) or peripheral surfaces 166 and 167 (annular disk). The carbon structure 160 illustrated in FIGS. 5, 7, and 9 is in the form of a circular disk, and for these disks the at least one other surface is outside peripheral surface 166. Alternatively, the carbon structure 160 may be in the form of an annular disk as illustrated in FIGS. 6, 8, 10, 11, and 12. The carbon structure 160, when in the form of an annular disk, has a center opening 165, and the at least one other surface comprises outside peripheral surface 166 and inside peripheral surface 167.

The support structure 140 may comprise any support fixture assembly that does not interfere with the flow of gas through the first and second surfaces 162 and 164, and the at least one other surface (e.g., peripheral surfaces 166 and 167) of the carbon structure 160. In one embodiment, with the possible exception of the perimeter or small areas in the perimeter of the surfaces 162 and/or 164 which may be in contact with clamps and/or other support fixture parts, the support structure 140 may not contact the surfaces 162 and 164 or the peripheral surfaces 166 and 167. Alternatively, the first surface 148 of the support structure 140 may comprise a perforated or porous material that is sufficiently porous to permit gas flow to and through the second surface 164 of the carbon structure 160 and, in this embodiment, the first surface 148 of the support structure 140 may contact the second surface 164 of the carbon structure 160. The seal ring 180, which may be formed separately from or integrally with the support structure 140, may contact part of the second surface 164 of the carbon structure 160.

The densification unit 120 includes cooling element 142 which is in thermal contact with second generally planar surface 164 of the carbon structure 160 and is adapted for cooling the second surface 164. The cooling element 142 may comprise one or more cooling conduits or channels in the support structure 140. The cooling element 142 may use any suitable fluid coolant such as water, nitrogen, oil, and the like. The coolant may flow into and out of the cooling element 142 as indicated by arrows 144 and 146. Alternatively, the cooling element 142 may comprise one or more non-fluid cooling elements.

The densification unit 120 includes heating element 122 (a heating element may also be referred to as a "heating source" or "heat source"), as shown in FIG. 5. Heating element 122 is positioned in thermal contact with the first surface 162 of the carbon structure 160 and is adapted for heating the first surface 162. The heating element 122 may be in the form of a susceptor, resistance heating element or microwave heating element. Although not shown in the drawings, an induction coil and an insulation barrier may be used in combination with the heating element 122. The heating element 122 may be positioned above and aligned perpendicular to the carbon structure 160, as illustrated in FIG. 1. The heating element may be in the form of a vertically oriented cylindrical structure with a center opening to permit the flow of gas through the center opening away from the carbon structure 160. Alternatively, the heating element 122 may be positioned above or apart from and aligned parallel with the first surface 162. The heating element 122 may be positioned at an inclined angle relative to the first surface 162. The heating element 122 may be spaced sufficiently from the carbon structure 160 to permit gas flowing through the carbon structure to flow away from the carbon structure. A protective shroud may be positioned between the heating element 122 and the carbon structure 160 to protect the heating element from reactive gases forming solid deposits on the heating element. The protective shroud may be made of any suitable material, for example, graphite.

The densification unit 120 includes lower wall 124, and cylindrical wall section 126. Cylindrical wall section 126 surrounds support structure 140 and carbon structure 160. The densification unit 120 includes upper wall 127 and exhaust outlet 128. The upper wall 127 may form part of the heating element 122. The densification unit 120 includes insulation layer 130 which is positioned between the cylindrical wall section 126, and the support structure 140 and carbon structure 160. The use of insulation layer 130 is optional. The densification unit 120 includes gas inlet 132.

The densification chamber 100 includes exhaust outlet 102 which may be connected to a vacuum system (system 110 from FIG. 3). The vacuum system may comprise any vacuum system capable of reducing the pressure within the densification chamber 100 to a level of about 1 torr or less, and in one embodiment to a level of about 0.1 torr or less. The vacuum system may also be adapted for withdrawing exhaust gases from the densification chamber 100 through outlet 102 during the densification process.

The support structure 140 has a first surface 148 which may be positioned opposite the second surface 164 of the carbon structure 160. The first surface 148 may also function as part of the cooling element 142. A first open space 150 may be positioned between the first surface 148 of the support structure 140 and the second surface 164 of the carbon structure 160. The first open space 150 may be positioned within the side walls of seal ring 180. The first open space 150 may be adapted for receiving gas flowing from the gas inlet 132 into contact with the second surface 164 of the carbon structure 160.

A second open space 152 may be positioned adjacent to the peripheral surface 166 of the carbon structure 160. The second open space 152 may be adapted for permitting gas to flow out of the carbon structure 160 through the peripheral surface 166.

A third open space 154 may be positioned adjacent the first surface 162 of the carbon structure 160. The third open space 154 may be adapted for permitting gas to flow out of the carbon structure 160 through the first surface 162. When the heating element 122 is positioned parallel to the first surface 162, the third open space 154 may be positioned between the heating element 122 and the first surface 162.

When the carbon structure is in the form of an annular disk, a fourth open space or center opening 165 may be positioned adjacent to the inside peripheral surface 167 of the carbon structure 160. The fourth space 165 may be adapted for permitting gas to flow out of the carbon structure 160 through the inside peripheral surface 167.

The seal ring 180 illustrated in FIG. 7 may have a layer of graphite cement 182 positioned between it and the second generally planar surface 164 of the carbon structure 160. The seal ring 180 may also have a gasket 184 positioned between it and the first surface 148. Use of the layer of graphite cement 182 and gasket 184 is optional. Clamps 185 and 186 may be provided for holding the carbon structure 160, seal ring 180 and support structure 140 together. The seal ring 180 may comprise a graphite seal ring. The gasket 184 may comprise a flexible graphite gasket. The gasket 184 may be made of GRAFOIL® which is a flexible graphite available from GrafTech International Holdings Inc., 12900 Snow Road Parma, Ohio, USA, 44130. Although two clamps, namely clamps 185 and 186, are illustrated in FIG. 5, any desired number of clamps may be used, for example, one, two, three, four, five, six, etc.

Figure 8:
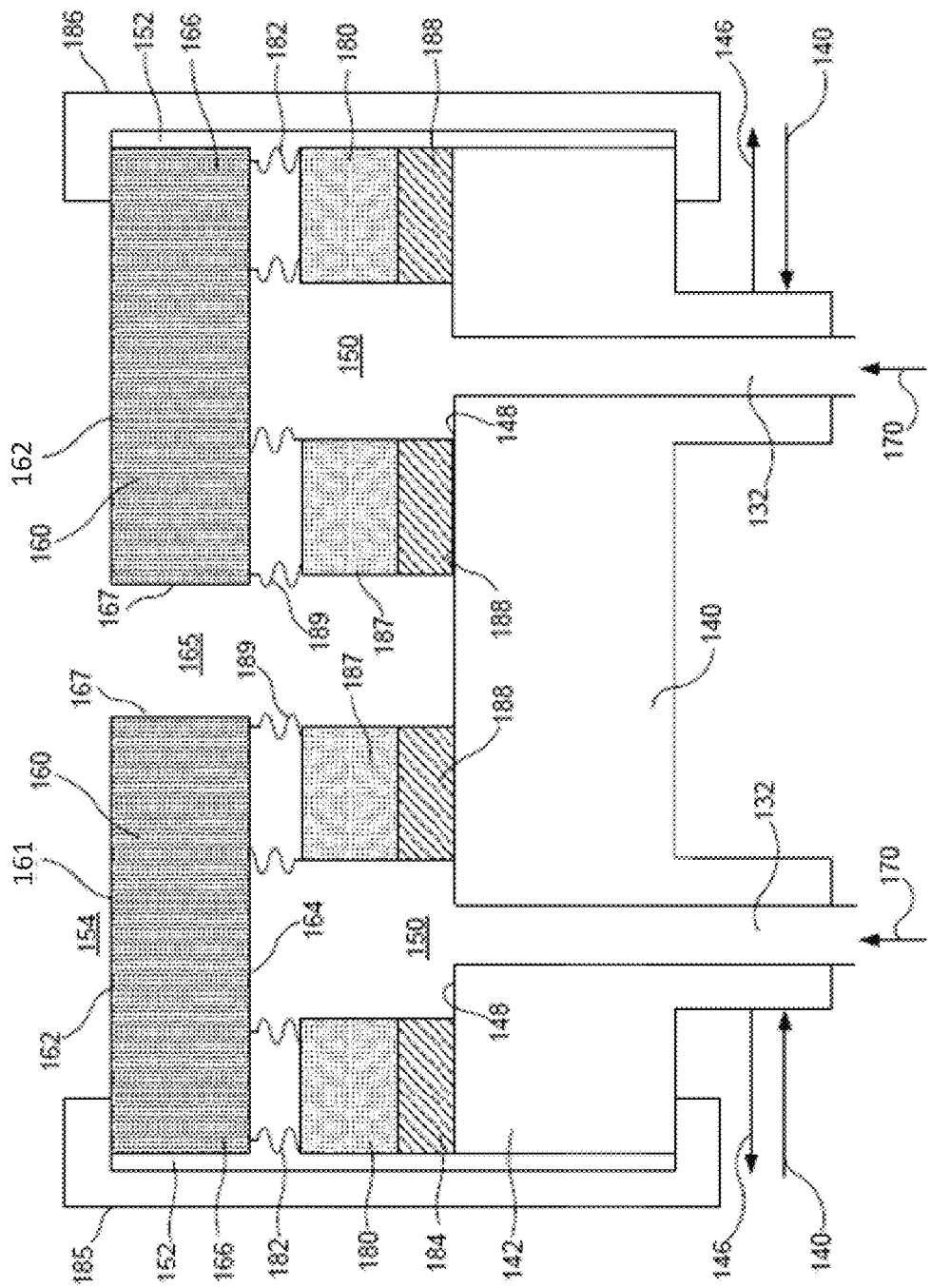
FIG. 8 is a schematic illustration of an apparatus similar to the apparatus illustrated in FIG. 7 with the exception that the carbon structure illustrated in FIG. 8 is in the form an annular ring while the carbon structure illustrated in FIG. 7 is in the form a circular ring.
Figure 9:
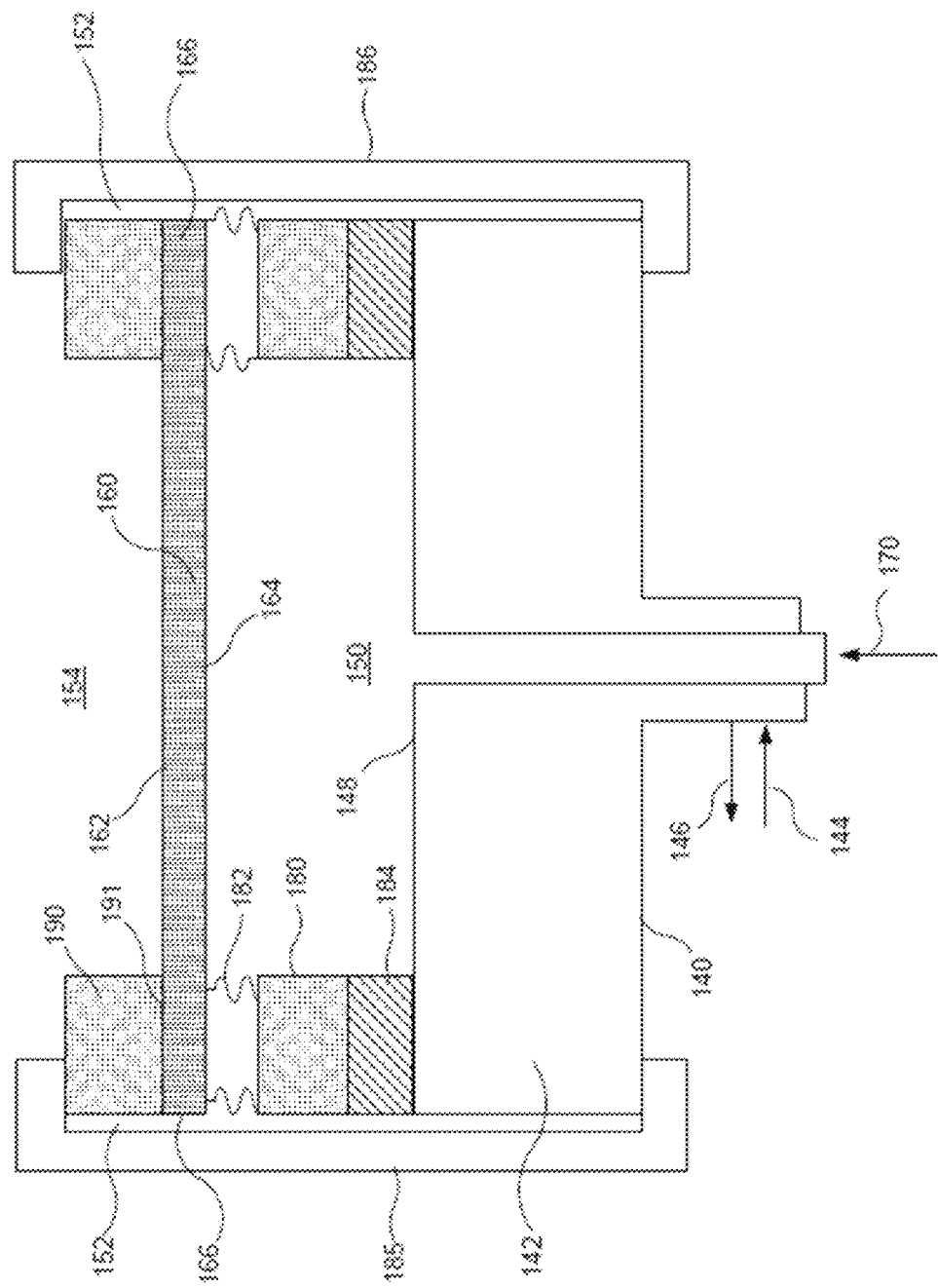
FIG. 9 is a schematic illustration of an apparatus similar to the apparatus illustrated in FIG. 5 with the exception that that apparatus illustrated in FIG. 7 includes a seal ring overlying the outer edge of the upper surface of the carbon structure.
Figure 10:
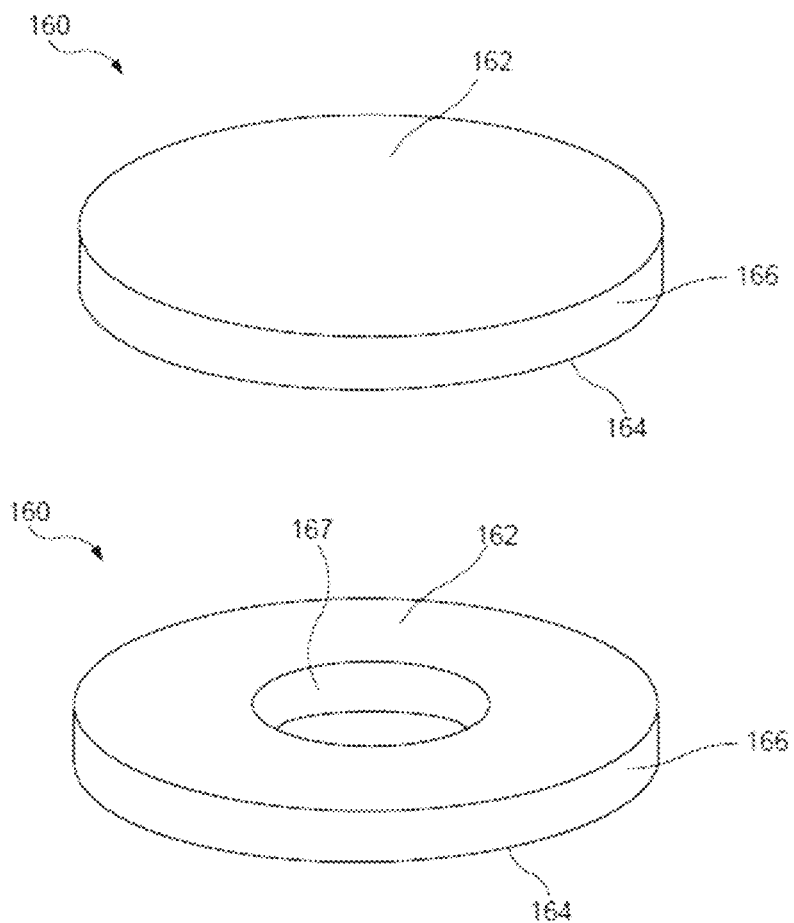
FIG. 10 shows schematic illustrations of two carbon structures that may be densified pursuant to the disclosed invention.

The apparatus illustrated in FIG. 8 is the same as illustrated in FIG. 7 with the exception that carbon structure 160 is in the form of an annular disk rather than a circular disk. The carbon structure 160 illustrated in FIG. 6 includes center opening 165, which may be referred to as a fourth open space. The carbon structure 160 has an outside peripheral surface 166 and an inside peripheral surface 167. The apparatus may have an outside seal ring 180, which may be the same as the seal ring 180 illustrated in FIG. 5, and an inside seal ring 187. The inside seal ring 187 may have a layer of cement 189 positioned between it and the second generally planar surface 164 of the carbon structure 160. The seal ring 187 may also have a gasket 188 positioned between it and the first surface 148. The layer of cement 189 and gasket 188 may be optional. The seal ring 187 may comprise a graphite seal ring. The layer of cement 189 may comprise a graphite cement. The gasket 188 may comprise a flexible graphite gasket. The gas inlet 132 and the first space 150 may each have an annular shape.

The apparatus illustrated in FIG. 9 is the same as illustrated in FIG. 7 except that the carbon structure 160 has a reduced thickness, and seal ring 190 may overlie the outer portion 191 of the first generally planar surface 162 of carbon structure 160. The seal ring 190 may comprise a graphite seal ring. Clamps 185 and 186 may hold seal ring 190 against the first generally planar surface 162. The clamps may also hold the carbon structure 160, seal ring 180 and support structure 140 together.

In operation, the carbon structure 160 may be mounted on the support structure 140. The heating element 122 may be heated to heat the first surface 162 to a temperature in the range from about 800 to about 1700° C., and in one embodiment in the range from about 850 to about 1500° C., and in one embodiment in the range from about 900 to about 1350° C. A coolant may flow in the cooling element 142 to provide cooling to the second surface 164 of the carbon structure 160. The temperature of the second surface 164 may be in the range from about 400 to about 1500° C., and in one embodiment in the range from about 500 to about 1200° C., and in one embodiment in the range from about 600 to about 1100° C. The difference in temperature between the temperature of the first surface 162 and the second surface 164 establishes a thermal gradient across the thickness of the carbon structure 160. The thickness of the carbon structure 160 may be the length extending from the first generally porous surface 162 to the second generally porous surface 164. The thermal gradient across the thickness of the carbon structure may be in the range from about 25 to about 450° C. per centimeter of thickness (° C./cm) of the carbon structure 160, and in one embodiment in the range from about 50 to about 400° C./cm, and in one embodiment in the range from about 100 to about 350° C./cm, and in one embodiment in the range from about 150 to about 300° C./cm.

The vacuum system (system 110 from FIG. 3) may be used to establish an absolute pressure in the open spaces 152, 154 and 165 in the range from about 1 to about 760 torr, and in one embodiment in the range from about 5 to about 100 torr, and in one embodiment in the range from about 5 to about 50 torr, and in one embodiment in the range from about 5 to about 20 torr, and in one embodiment about 10 torr. The feed gas may flow in gas inlet 132, as indicated by arrow 170, and from the inlet 132 into the space 150 in contact with the second surface 164 of the carbon structure 160. The absolute pressure in the open space 150 may be higher than in the open space 154 and may be in the range from about 5 to about 1000 torr, and in one embodiment in the range from about 5 to about 500 torr, and in one embodiment in the range from about 10 to about 200 torr. The difference in pressure between the pressure in the open space 150 and the pressure in the open space 154 may be in the range from about 5 to about 400 torr, and in one embodiment in the range from about 20 to about 200 torr. The difference in pressure between the pressure in the open space 150 and the pressure in the open spaces 152 and 165 may be in the range from about 5 to about 400 torr, and in one embodiment in the range from about 20 to about 200 torr. The pressure gradient across the thickness of the carbon structure 160 from the second surface 164 to the first surface 162 may be in the range from about 0.5 to about 1000 torr/cm, and in one embodiment in the range from about 1 to about 500 torr/cm, and in one embodiment in the range from about 2 to about 100 torr/cm, and in one embodiment in the range from about 5 to about 50 torr/cm. The pressure gradient across the carbon structure 160 from the second surface 164 to the peripheral surfaces 166 and 167 may be in the range from about 2 to about 1000 torr/cm, and in one embodiment in the range from about 5 to about 500 torr/cm.

Figure 11:
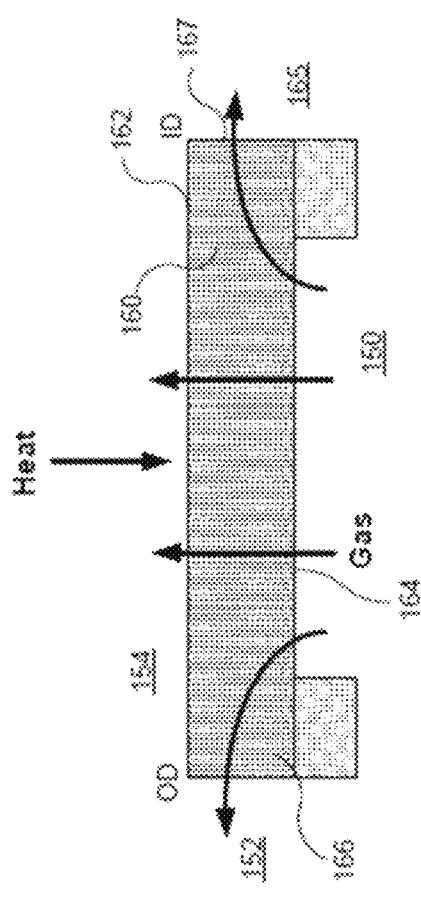
FIGS. 11 and 12 are schematic illustrations showing the flow of gas through a carbon structure during stages of the inventive densification process to make a composite structure.
Figure 12:
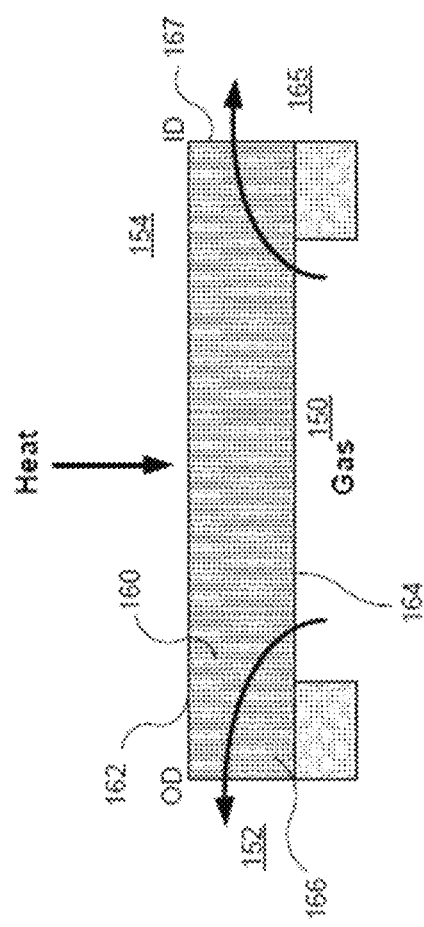
Figure 13:
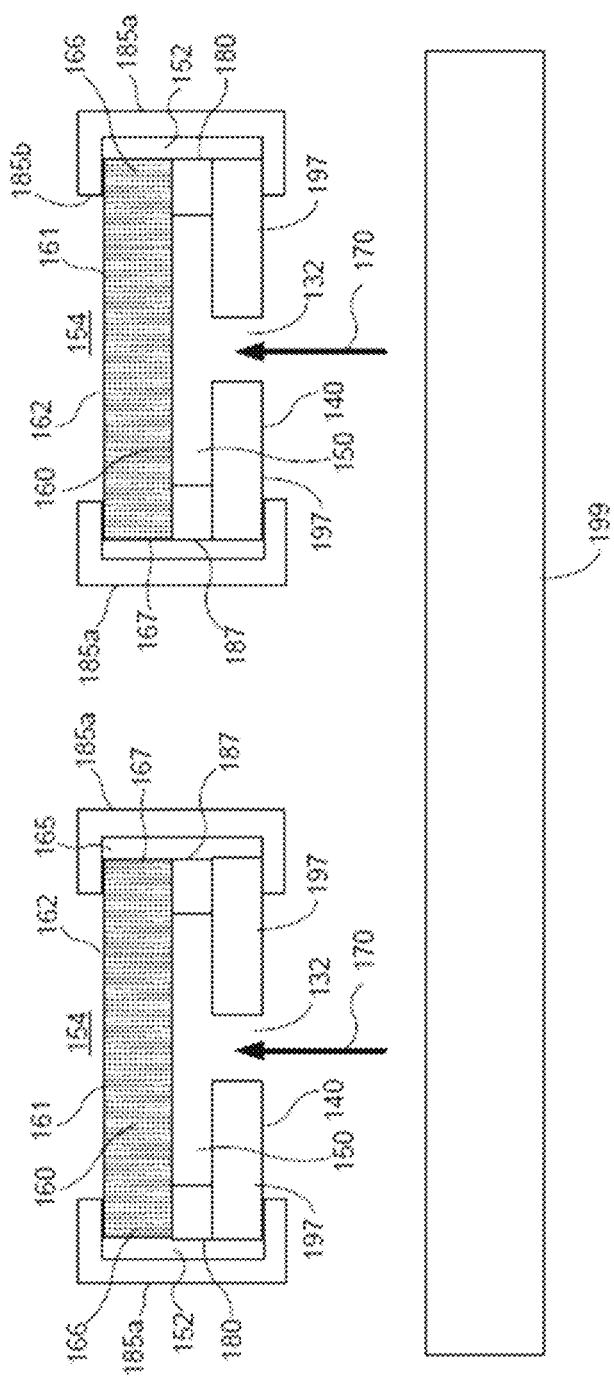
FIG. 13 is a schematic illustration of a densification chamber that may be used for densifying one or more carbon structures to form one or more composite structures.

The feed gas may flow from the open space 150 into the carbon structure 160 wherein at least part of the gas undergoes thermal pyrolysis and forms a solid residue in the pores of the carbon structure 160. The gases that do not undergo thermal pyrolysis (i.e., the unreacted gases) as well as any by-product gases that may be generated during the densification process may flow through the carbon structure 160 and out of the densification chamber 100 through the gas outlet 102, as indicated by arrow 172. As the process continues, the build up of solid residue within the carbon structure may result in a gradual densification of the carbon structure 160 and the formation of the composite structure 160. The densification generally proceeds from the hot side or the first surface 162 to the cold side or the second surface 164. During an early stage of the densification process, the gases may flow through the carbon structure 160 to and through the first planar surface 162 and to and through the peripheral surfaces 166 and 167 as illustrated in FIG. 11. During a late stage of the densification process the gases may flow through the carbon structure 160 to and through the peripheral surfaces 166 and 167 as illustrated in FIG. 12. The early stage densification, at least during the formation of a carbon/carbon/ceramic composite, may be conducted over a period of time in the range from about the first half to about the first three-quarters of the densification process. The late stage densification may be conducted over a period of time in the range from about the last half to about the last one-quarter of the densification process. The overall densification process may be conducted over a period of time in the range from about 10 to about 250 hours, and in one embodiment in the range from about 15 to about 175 hours, and in one embodiment in the range from about 24 to about 100 hours, and in one embodiment in the range from about 24 to about 75 hours, and in one embodiment in the range from about 24 to about 65 hours.

In one embodiment, the thermal gradient and/or pressure gradient across the carbon structure may be varied during the densification process in order to optimize the densification of the carbon structure. This may be accomplished by changing the temperature of the coolant in the cooling element 142 and/or changing the flow rate of the coolant in the cooling element. This may also be accomplished by changing the type of coolant used in the cooling element 142. When the coolant is water, the water may be chilled prior to entering the cooling element 142 to increase the temperature differential between carbon structure 160 and the cooling element 142. This may increase the heat transfer rate between carbon structure 160 and the cooling element 142. The heat transfer rate may be decreased during the densification process by allowing the water temperature in the cooling element 142 to rise. The pressure within the cooling element 142 may be increased to prevent the water from vaporizing. Coolants other than water, such as various oils with higher boiling points than water, may be used as the coolant. The coolants with higher boiling points than water may be used to operate the cooling element 142 at higher temperatures and thereby reduce the temperature differential between the cooling element 142 and the carbon structure 160. The flow rate within the cooling element 142 may be varied to vary the temperature within the cooling element. For example, a relatively high flow rate may tend to maintain the cooling element 142 at a relatively cool temperature, and a relatively low flow rate may allow the temperature of the cooling element 142 to increase. The pressure gradient across the carbon structure may be varied during the densification process by decreasing or increasing the feed gas flow rates. For example, the increase in the pressure gradient that occurs as a preform densities may be limited to a maximum value by lowering the feed gas flow rates during the latter stages of the densification process.

The thermal gradient may also be varied by moving the cooling element away from the carbon structure during the densification process and/or moving the carbon structure away from the cooling element during the densification process. This may be accomplished using the densification fixtures illustrated in FIG. 6. Referring to FIG. 6, the densification fixtures 125 include support pipe 141, threaded rod 143, nut 151, bottom plate 149, clamps 147 at the outside diameter of the carbon structure 160, top clamp 157 which may include holes for gas flow, seal ring 153, lower clamp/seal 158, and insulators 133. The bottom plate 149, nut 151, top clamp 157, and lower clamp/seal 158 may be made of graphite. The insulators 133 may be made of carbon foam. The densification fixtures 125 include gas inlet 132, and temperature indicator leads 156. Also included are first open space 150, second open space 152, third open space 154 and fourth open space 165 which are the same as described above. The densification process may be conducted by establishing a thermal gradient across the carbon structure 160 as discussed above using heating elements (not shown in FIG. 6) and a coolant (e.g., water or oil) in cooling element 145. The reactant gas may flow through the support pipe 141 into the first space 150 and from the first space 150 into the carbon structure 160 as described above and as shown in FIG. 6 by arrows 155. The gap between the carbon structure 160 and the cooling element 145 may be adjusted by moving the bottom plate 149 up or down relative to the cooling element 145. The bottom plate 149 may be moved up or down by turning the threaded rod 143.

In various embodiments, the carbon structure may be in the form of a circular disk or an annular disk with an outside diameter in the range from about 10 to about 80 cm, a thickness in the range from about 0.1 to about 10 cm, and the time required to make the composite structure may be in the range from about 10 to about 100 hours.

The carbon structure may be in the form of a circular disk or an annular disk having physical properties as described herein.

The density of the carbon structure 160 may increase gradually as the process progresses and the composite structure is formed. The flow rate of the gas through the second surface 164 may be reduced to maintain a substantially constant difference in pressure between the pressure at second surface 164 and the pressure at the first surface 162. The temperature of the heating element 122 may be decreased gradually while the temperature of the cooling element 142 is increased. Alternatively, the temperature of the heating element 122 may be increased gradually while the temperature of the cooling element 142 is maintained constant. The temperature of the cooling element 142 may be decreased gradually while the temperature of the heating element 122 is maintained constant.

The carbon/carbon/ceramic composites produced using the processes disclosed herein may have an overall average density of at least about 1.5 g/cc, and in various embodiments in the range from about 1.5 to about 2.2 g/cc, and in various embodiments in the range from about 1.5 to about 2.1 g/cc, and in various embodiments in the range from about 1.7 to about 2 g/cc, and in various embodiments in the range from about 1.7 to about 1.9 g/cc, and in one embodiment in the range from about 1.8 to about 1.9 g/cc. These composites may have average porosities in the range up to about 15%, and in one embodiment in the range from about 1% to about 15%, and in one embodiment in the range from about 1% to about 10%, and in one embodiment in the range from about 1 to about 5%. The carbon/carbon composites may have substantially rough laminar microstructures throughout about 80% to about 100% of their structures, and in one embodiment from about 95% to about 100%.

The composite structure may be heat treated in accordance with step 210 of process 200 subsequent to densification in a vacuum (e.g., via vacuum system 110 from FIG. 3) or an inert atmosphere at a temperature in the range from about 1600 to about 2800° C., and in one embodiment in the range from about 1650 to about 2200° C., for a period of time in the range up to about 10 hours, and in one embodiment in the range up to about 2 hours. When the composite structure is a carbon/carbon composite intended for use as an aircraft brake disk, this heat treating step may be used to adjust the friction and/or wear properties of the composite. When the carbon/carbon composite is intended for used as an aircraft brake disk, the microstructure of the composite may comprise a substantially rough laminar content in the range from about 80 to about 100% of its structure, and in various embodiments in the range from about 95 to about 100.

Figure 14:
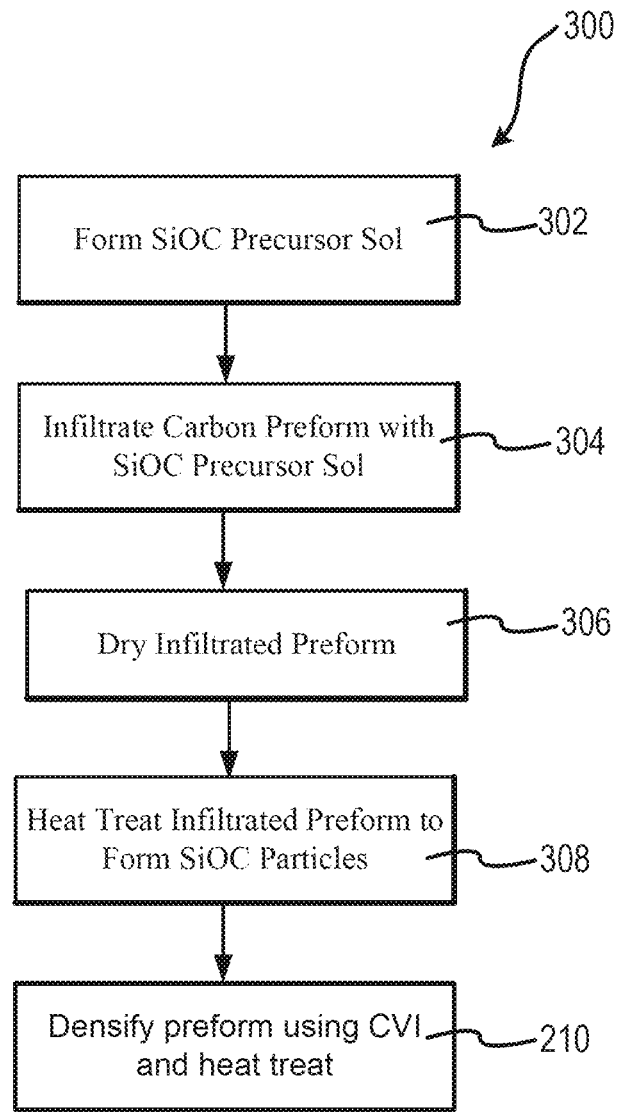
FIG. 14 illustrates a process for forming carbon components with a ceramic material, in accordance with various embodiments.

With reference to FIG. 14, a method 300 for making a C/C composite having SiOC particles is shown, in accordance with various embodiments. Method 300 may be employed to form one or more of the friction disks of FIG. 1. In accordance with various embodiments, method 300 includes forming a SiOC precursor sol (Step 302). The SiOC precursor sol may be formed by combining an allyltrimethoxysilane with a carrier fluid such as, for example, water, and stirring SiOC precursor sol, for between about 10 minutes and about 60 minutes, or for about minutes (as used in the previous context only the term "about" means ±15 minutes).

In accordance with various embodiments, the allyltrimethoxysilane may be transformed into SiOC particles through a transformation into gel, followed by decomposition reaction in a nitrogen environment, as described in Step 308 below. The concentration of the allyltrimethoxysilane and the viscosity of the SiOC sol may be adjusted by adding additional water to the sol.

In accordance with various embodiments, method 300 further comprises infiltrating the fibrous preform with the SiOC precursor sol (Step 304). In various embodiments, infiltration may be conducted by immersing the fibrous preform in the aqueous SiOC precursor sol. In various embodiments, infiltration may be conducted following evacuation of the pores of the carbon structure 160 from FIG. 2 using a vacuum chamber 114 from FIG. 3. For example, the carbon structure 160 from FIG. 2 may be infiltrated with the SiOC precursor sol using system 110 in FIG. 3.

In various embodiments, following infiltration, the fibrous preform may be dried to remove water and/or any other carrier fluid (Step 306). The SiOC precursors may increase a weight of the dry preform by between 10% and 50%. In this regard, after drying, the weight of the infiltrated fibrous preform may be between 10% and 50% greater than the weight of the fibrous preform prior to infiltration (i.e., prior to Step 304). In various embodiments, the ratio of MTMS to water in the SiOC precursor sol may be selected between 10% and 50%. As used in the previous context only, the term about means ±0.5%. The target weight percentage increase may provide a volume of SiOC particles that improve the wear of the final C/C composite component without negatively impacting the mechanical properties (e.g., friction) of the C/C composite component. In various embodiments, the SiOC particles may form between 0.5% and 10.0%, between 0.5% and 5%, between 3.0% and 5.0%, or about 4.0% of the total weight of the final C/C composite. As used in the previous context only, the term "about" means ±0.5%.

In various embodiments, the infiltrated fibrous preform may undergo a heat treatment (Step 308). Step 308 may include heat treating the infiltrated fibrous preform to a suitable temperature to transform the SiOC precursors into SiOC particles. In various embodiments, the heat treatment (also referred to herein as a "SiOC forming heat treatment") is performed in the presence of an inert gas (e.g., nitrogen gas). Step 308 may be conducted in a separate furnace or during the ramp up to the temperature of the carbon densification cycle(s) (as described previously herein in Step 210). In various embodiments, the SiOC forming heat treatment may comprise heat treating the infiltrated fibrous preform in the presence of nitrogen gas and at a temperature of between 700° C. and 1300° C. (between 1292° F. and 2372° F.) for between 0.5 hour and 5.0 hours. In various embodiments, the SiOC forming heat treatment may comprise heat treating the infiltrated fibrous preform in the presence of nitrogen gas and at a temperature of between 700° C. and 1200° C. (between 1292° F. and 2192° F.) for between hour and 5.0 hours. In various embodiments, the SiOC forming heat treatment may comprise heat treating the infiltrated fibrous preform in the presence of nitrogen gas and at a temperature of between 1000° C. and 1200° C. (between 1832° F. and 2192° F.) for between and 2.0 hours. In various embodiments, the SiOC forming heat treatment may comprise heat treating the infiltrated fibrous preform in the presence of nitrogen gas and at a temperature of about 1050° C. (1922° F.) for about 1.0 hour. As used in the previous context only, the term "about" means ±25° C. (±77° F.). In accordance with various embodiments, heating the infiltrated preform in the presence of nitrogen gas may initiate the transformation of the SiOC precursors into SiOC particles. In this regard, at least a portion of the SiOC particles may be formed during the heat treatment (e.g., during Step 308).

In various embodiments, after heat treating the infiltrated fibrous preform (e.g., after Step 308) one or more densification cycles may be performed (Step 210). Step 250 results in a C/C composite that is substantially uniform a (also referred to herein as a densified fibrous preform). In various embodiments, the densification is done using chemical vapor infiltration (CVI) in accordance with step 210 from method 200 in FIG. 4. During densification, the carbon matrix is formed by depositing carbon on and around the carbon fibers. In various embodiments, densification may comprise a single CVI cycle. In various embodiments, densification may include multiple CVI cycles. Each CVI cycle may be followed by a heat treatment. In various embodiments, the SiOC particles may form between about 0.5% and about 15.0%, or between 0.5% and about 10.0%, or between about 0.5% and about 5%, and/or between about 3.0% and about 5.0% of the total weight of the final C/C composite. As used in the previous context only, the term "about" means ±0.5%. In various embodiments, the final C/C composite may have a final density of at least 1.75 g/cc. In various embodiments, the final C/C composite may have a final density of at least 1.8 g/cc.

Figure 15A:
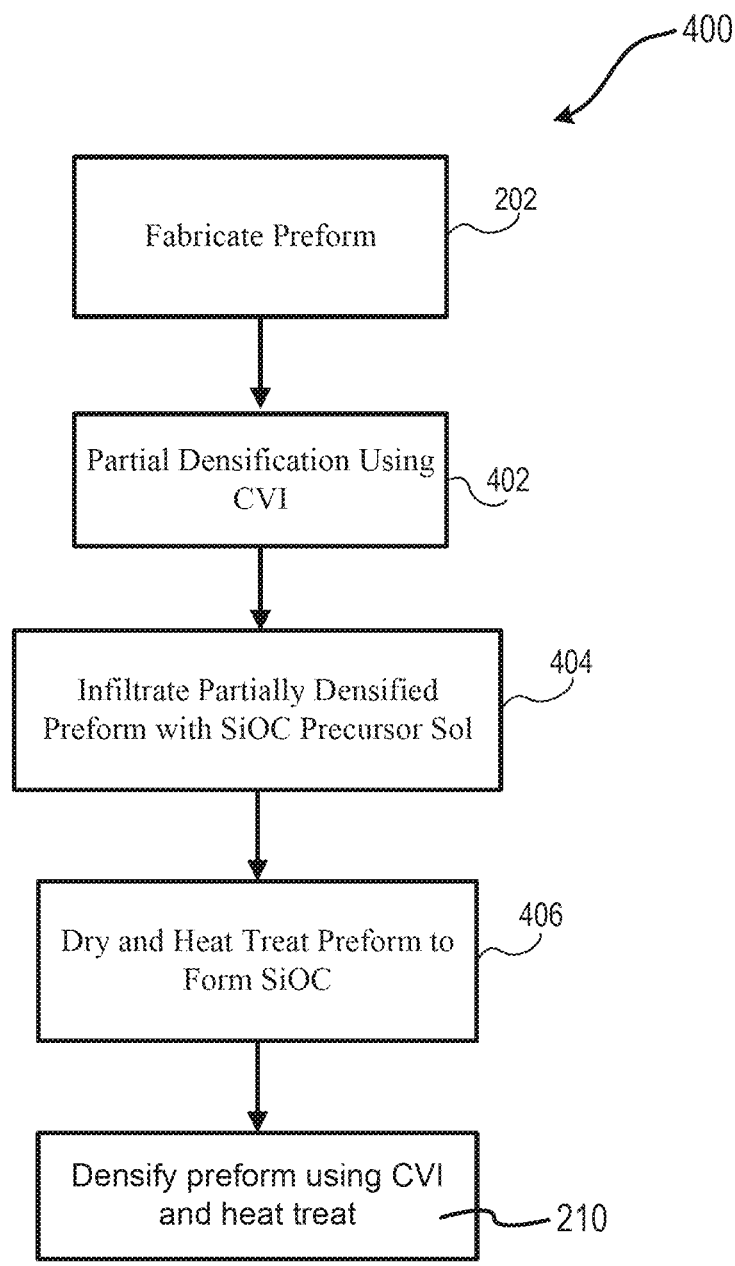
FIG. 15A illustrates a process for forming carbon components with a ceramic material, in accordance with various embodiments.

With reference to FIG. 15A, in various embodiments, a method 400 for making a C/C composite having SiOC particles is shown, in accordance with various embodiments. Method 400 may be employed to form one or more of the friction disks of FIG. 1. In accordance with various embodiments, method 400 may include forming a fibrous preform (Step 202). Step 202 may include carbonizing the fibrous preform such that the carbon fibers of the preform are at least 99% carbon.

The fibrous preform may then be partially densified using CVI (Step 402). The partial densification may cause a portion of the porosity of the fibrous preform to be filled/densified with the carbon matrix. The partially densified fibrous preform may then heat treated (Step 306) prior to infiltration and densification. Stated differently, after carbonization and prior to infiltration and densification, the fibrous preform may undergo a (first) heat treatment. The first heat treatment of Step 304 may comprise heat treating the fibrous preform at a temperature of between 1600° C. and 2600° C. (between 2912° F. and 4712° F.) for between 1.0 hour and 20.0 hours. In various embodiments, the first heat treatment may comprise heat treating the fibrous preform at a first temperature of between 1800° C. and 2400° C. (between 3272° F. and 4352° F.) for between 4.0 and 20.0 hours.

The partial densification of step 402 can be in partially in accordance with step 210 described previously herein. The partially densified fibrous preform may then be infiltrated with a SiOC precursor sol (Step 404). Step 404 may be similar to Step 304, described above with reference to method 300. In accordance with various embodiments, the SiOC precursor sol may include a mixture of MTMS and water. In various embodiments, the SiOC precursor sol may be formed as described above with reference to Step 302 of method 300.

After infiltration, the infiltrated fibrous preform is dried and heat treated (Step 406). Step 406 may be similar to drying Step 306 and SiOC forming heat treatment Step 308, described above with reference to method 300. SiOC particles may be, at least, partially formed during Step 406. The fibrous preform, which now includes SiOC particles may then be further densified using CVI and may undergo a final heat treatment (Step 210). In various embodiments, the final C/C composite may have a final density of at least 1.75 g/cc. In various embodiments, the final C/C composite may have a final density of at least 1.8 g/cc. In various embodiments, the density across a thickness of the carbon structure formed from method 400 can be substantially uniform as described previously herein.

Figure 15B:
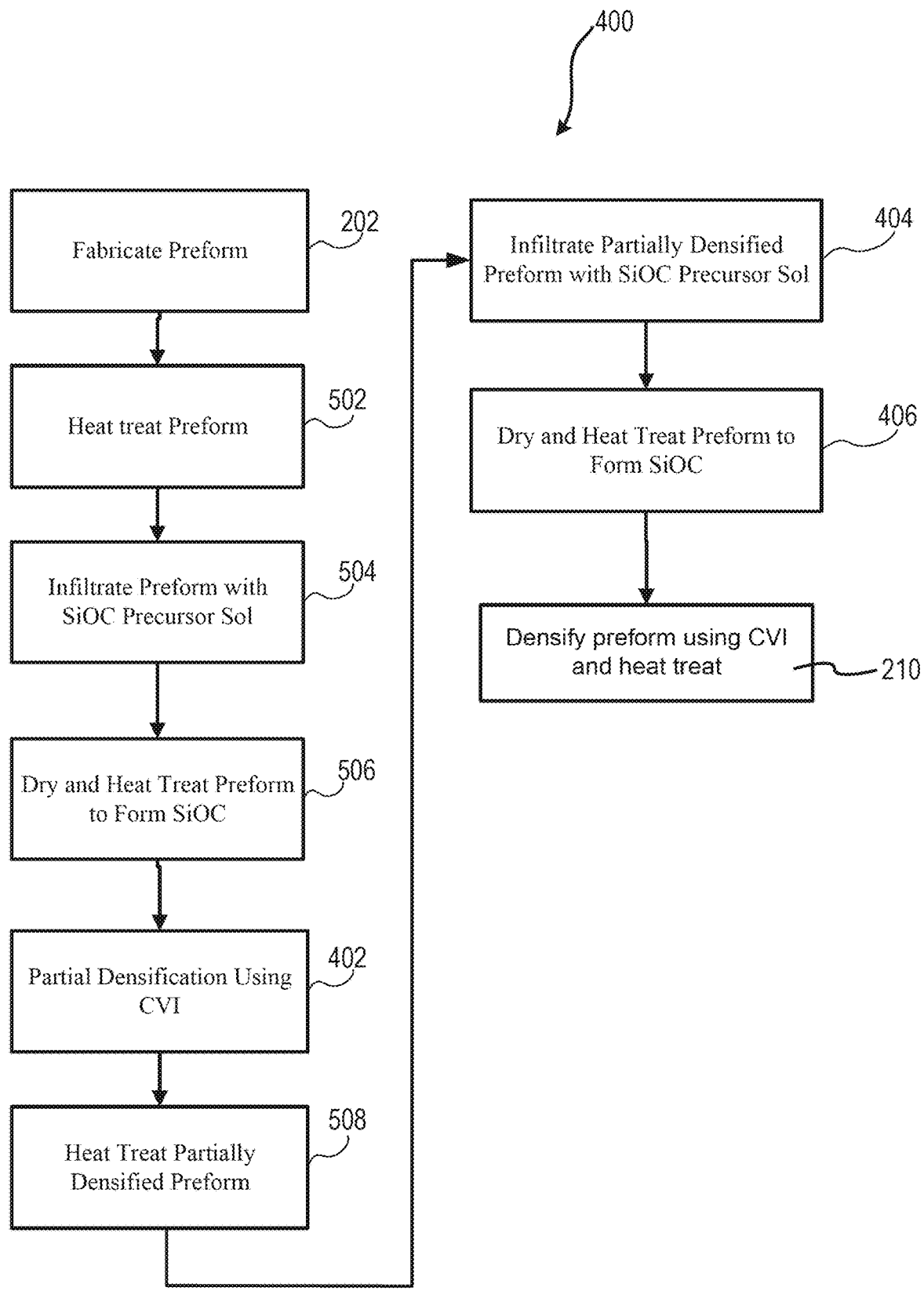
FIG. 15B illustrates a process for forming carbon components with a single application of ceramic material followed by multiple chemical vapor infiltration (CVI) densification steps, in accordance with various embodiments.

With reference to FIG. 15B, in various embodiments, method 400 may include multiple infiltration steps and/or additional heat treatments. For example, in various embodiments, method 400 may include a heat treating the fibrous preform prior to infiltration and densification and (step 502). Stated differently, after carbonization and prior to infiltration and densification, the fibrous preform may undergo a (first) heat treatment. The first heat treatment of step 502 may comprise heat treating the fibrous preform at a temperature of between 700° C. and 1200° C. (between 1292° F. and 2192° F.), between 1050° C. and 1150° C. (between 1922° F. and 2102° F.), or 1100° C. (2012° F.), in accordance with various embodiments. Step 312 may include heat treating the partially densified fibrous preform at temperature for between 1.0 hour and 20.0 hours, or between 4.0 hours and 20.0 hours, in accordance with various embodiments. In various embodiments, the first heat treatment may comprise heat treating the fibrous preform at a first temperature of between 1800° C. and 2400° C. (between 3272° F. and 4352° F.) for between 4.0 and 20.0 hours.

In various embodiments, method 400 further includes infiltrating the fibrous preform with a SiOC precursor sol (Step 504) prior to partially densifying (i.e., prior to step 402). Step 504 may be similar to Step 304, described above with reference to method 300. In accordance with various embodiments, the SiOC precursor sol may include a mixture of MTMS and water. In various embodiments, the SiOC precursor sol may be formed as described above with reference to Step 302 of method 300.

After infiltration, the infiltrated fibrous preform is dried and heat treated to (Step 506). Step 506 may be similar to drying Step 306 and SiOC forming heat treatment Step 308, described above with reference to method 300. SiOC particles may be, at least, partially formed during Step 506. The fibrous preform, which now includes SiOC particles may then be partially densified using CVI. (Step 402). The partial densification may cause a portion of the porosity of the fibrous preform to be filled/densified with the carbon matrix. After the partial densification, the partially densified fibrous preform may be heat treated (Step 508). Step 508 may include heat treating the partially densified fibrous preform at a temperature of between 1600° C. and 2500° C. (between 2912° F. and 4532° F.) or between 1800° C. and 2200° C. (between 3272° F. and 3992° F.) for between 1.0 and 20.0 hours.

After heat treating the partially densified preform (i.e., after step 508), the partially densified fibrous preform may be infiltrated with a SiOC precursor sol (Step 404). Step 404 may be similar to Step 304, described above with reference to method 300. In various embodiments, the composition of the SiOC precursor sol employed in Step 504 may be the same as the composition of SiOC precursor sol employed in Step 404. In various embodiments, a weight ratio of the components in SiOC precursor suspension employed in Step 504 may be different from a weight ratio of the components in SiOC precursor suspension employed in Step 404.

After the second infiltration, the infiltrated fibrous preform is dried and heat treated (Step 406). Step 406 may be similar to drying Step 306 and SiOC forming heat treatment Step 308, described above with reference to method 300. SiOC particles may be, at least, partially formed during Step 406. The fibrous preform, which now includes SiOC particles may then be further densified using CVI and may undergo a final heat treatment (Step 210). In various embodiments, step 210 may result in a C/C composite having a density of at least at least 1.75 g/cc. In various embodiments, the final C/C composite may have a final density of at least 1.8 g/cc. In various embodiments, step 210 may result in a C/C composite having a substantially uniform density as described previously herein.

In accordance with various embodiments, the fibrous preform may be infiltrated at a single stage of the C/C composite fabrication, for example, at the preform level, as shown in Step 502 and Step 504 in FIG. 15B, or after a partial pyrolytic carbon densification, as shown in Step 404 of FIG. 15A. In various embodiments, the fibrous preform may be infiltrated during multiple stages of the C/C composite fabrication, as illustrated in Steps 504 and 404 of FIG. 15B. For example, a SiOC precursor sol, as described herein, may be introduced into the fibrous preform before and after one or more partial CVI pyrolytic densifications (e.g., a SiOC precursor sol infiltration may be performed both before and after Step 402 in FIG. 15B). Forming friction disk to include SiOC (e.g., using method 300 or method 400) improves the wear weight of the friction disk as compared to C/C composites. For example, initial wear testing has demonstrated a 30% wear improvement (i.e., 30% less wear) for friction disked formed of C/C including SiOC as compared to C/C composite friction disks. In various embodiments, a combination of forming friction disks to include SiOC and densifying the friction disks to be substantially uniform in step 210 via the systems shown in FIGS. 5-13 as described previously herein is expected to provide further wear benefits and allow lower amounts of SiOC to be present in the carbon disk. For example, a wear rate for a substantially uniform carbon disk can remain consistent and/or improve over time, whereas a wear rate for a carbon disk that is not substantially uniform can increase over time, in accordance with various embodiments.

It has been found that control of the temperature gradient, as described herein, may be used to modify, control, or adjust densification of a carbon structure. For example, a temperature gradient may be increased (e.g., via increasing the temperature of a heating element or decreasing the temperature of a cold plate) or decreased (e.g., via decreasing the temperature of a heating element or increasing the temperature of a cold plate) to control rate of deposition. Such temperature gradient control/adjustment may be performed to achieve improved deposition and/or penetration of gas into and/or on the carbon structure.

It has also been found that control of a pressure gradient, as described herein, may be used to modify, control, or adjust densification of a carbon structure. For example, a pressure gradient may be increased or decreased (e.g., by varying the pressure at which gas flows) to further control rate of deposition. Such pressure gradient control/adjustment may be performed to achieve improved deposition and/or penetration of gas into and/or on the carbon structure.

A change in the direction of gas flow may also address various problems associated with conventional densification means. In addition, a change in gas flow may be accompanied by a temperature gradient adjustment to achieve some or all of the benefits of the adjusted temperature gradient described herein.

It is possible, depending on various process parameters, for the exterior pores of a carbon structure to become sealed as time in the furnace increases, thus limiting the ability of a gas to penetrate into the carbon structure and negatively affecting the density of the final product. By adjusting or controlling the temperature gradient during processing, densification uniformity is improved.

Temperature gradient adjustment may also enhance the uniformity of the deposition on the exterior surfaces of the carbon structure. For example, temperature gradient adjustment may yield densified carbon structures having uniform depositions on both faces.

In various embodiments, the resultant carbon structure disclosed herein has a substantially uniform density as a function of thickness. In this regard, a planar density can be measured at various intervals along a thickness of the carbon structure. "Substantially uniform," as disclosed herein, refers to a local density at any given axial position between the first surface 162 and the second surface 164 being within 5% of an average density of the carbon structure, or within 3% of the average density of the carbon structure, or within 1% of the average density of the carbon structure, or within 0.5% of the average density of the carbon structure.

In various embodiments, gas flow direction may be adjusted or reversed so that gas is directed into a first inbound surface of a carbon structure and out an outbound surface of the carbon structure. The first inbound surface may comprise at least one of the first surface, the second surface, the inner diameter surface and the outer diameter surface. The outbound surface may not comprise the first inbound surface. For example, in an embodiment, the first inbound surface is the first surface and the outbound surface may be one or more of the second surface, the inner diameter surface and the outer diameter surface. Gas flow adjustment may occur, and the gas may be directed into a second inbound surface of the carbon structure where the second inbound surface comprises the first inbound surface. For example, the first inbound surface is the first surface and the second inbound surface is the second surface.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a carbon structure, comprising:
    infiltrating the carbon structure with a silicon oxycarbide (SiOC) precursor sol;
    densifying the carbon structure by chemical vapor infiltration (CVI) to form a carbon and ceramic matrix composite material, the carbon and ceramic matrix composite material comprising between 0% and 15% by weight of a plurality of ceramic particles, wherein densifying the carbon structure includes adjusting a temperature gradient across the carbon structure; and
    establishing a first thermal gradient in a process furnace, a first temperature of a first surface of the carbon structure being higher than a second temperature of a second surface of the carbon structure.

2. The method of claim 1, further comprising performing a SiOC forming heating treatment on the carbon structure to form SiOC particles.

3. The method of claim 2, wherein forming the SiOC precursor sol comprises combining methyltrimethoxysilane and a carrier fluid.

4. The method of claim 3, wherein the carrier fluid is water.

5. The method of claim 3, wherein performing the SiOC forming heating treatment on the carbon structure comprises heating the carbon structure at a temperature of between 900° C. and 1200° C.

6. The method of claim 5, wherein performing the SiOC forming heating treatment on the carbon structure further comprises heating the carbon structure in a presence of nitrogen gas.

7. The method of claim 3, further comprising partially densifying the carbon structure prior to infiltrating the carbon structure with the SiOC precursor sol.

8. The method of claim 1, further comprising establishing a second thermal gradient in the process furnace, the first temperature of the first surface of the carbon structure being lower than the second temperature of the second surface of the carbon structure in response to establishing the second thermal gradient.

9. The method of claim 1, wherein densifying the carbon structure further comprises:
    flowing gas through the second surface of the carbon structure to form a solid residue within the carbon structure.

10. The method of claim 9, wherein each ceramic particle of the plurality of ceramic particles comprises a size of less than 500 nanometers.

11. The method of claim 1, further comprising heat treating the carbon structure to a temperature ranging from 1000° C. to 1600° C.

12. A method of manufacturing a carbon-based brake disc, comprising:
    partially densifying a carbon structure, the partially densifying including establishing a first thermal gradient in a process furnace containing the carbon structure having a first surface and a second surface, a first temperature of the first surface of the carbon structure being higher than a second temperature of the second surface of the carbon structure;
    infiltrating the carbon structure with a ceramic compound; subsequently
    densifying the carbon structure by chemical vapor infiltration (CVI), the densifying including establishing a second thermal gradient in the process furnace containing the carbon structure, a third temperature of the first surface of the carbon structure being lower than a fourth temperature of the second surface of the carbon structure; and
    treating the carbon structure with heat at a fifth temperature ranging from 1000° C. to 1600° C. to form a plurality of ceramic particles, wherein the ceramic compound is a first silicon oxycarbide SiOC) precursor sol and wherein the ceramic compound comprises at least one of zirconium, titanium, yttrium, boron, boron carbide, and graphene.

13. A disk brake system, comprising:
    a plurality of friction disks; and
    wherein each friction disk in the plurality of friction disks is comprised of a carbon structure comprising a plurality of silicon oxycarbide (SiOC) particles dispersed in the carbon structure, the plurality of SiOC particles comprising between 0.5% and 15% by weight of the carbon structure, wherein a density of the carbon structure is substantially uniform, and wherein a local density at any given axial position between a first surface and a second surface is within 1% of an average density of the carbon structure or wherein the local density at any given axial position between the first surface and the second surface is within 0.5% of the average density of the carbon structure.

14. The disk brake system of claim 13, wherein the plurality of SiOC particles comprises between 0.5% and 5% by weight of the carbon structure.

* * * * *